(12) United States Patent
Teyeb et al.

(10) Patent No.: US 10,880,941 B2
(45) Date of Patent: Dec. 29, 2020

(54) METHOD AND APPARATUS FOR TRAFFIC AGGREGATION SETUP BETWEEN WLAN AND 3GPP

(71) Applicant: Telefonaktiebolaget LM Ericsson (publ), Stockholm (SE)

(72) Inventors: Oumer Teyeb, Solna (SE); Icaro L. J. da Silva, Bromma (SE); Filip Mestanov, Sollentuna (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 765 days.

(21) Appl. No.: 15/108,733

(22) PCT Filed: Mar. 11, 2016

(86) PCT No.: PCT/SE2016/050201
§ 371 (c)(1),
(2) Date: Jun. 28, 2016

(87) PCT Pub. No.: WO2016/148626
PCT Pub. Date: Sep. 22, 2016

(65) Prior Publication Data
US 2017/0048913 A1    Feb. 16, 2017

Related U.S. Application Data

(60) Provisional application No. 62/132,875, filed on Mar. 13, 2015.

(51) Int. Cl.
*H04W 48/18*       (2009.01)
*H04W 76/02*       (2009.01)
(Continued)

(52) U.S. Cl.
CPC .......... *H04W 76/16* (2018.02); *H04W 48/18* (2013.01); *H04W 84/12* (2013.01); *H04W 88/06* (2013.01); *H04W 88/08* (2013.01); *H04W 92/10* (2013.01)

(58) Field of Classification Search
CPC ... H04W 76/16; H04W 76/026; H04W 48/18; H04W 84/12; H04W 88/06; H04W 88/08; H04W 92/10
(Continued)

(56) References Cited

U.S. PATENT DOCUMENTS 8,045,515 B2 * 10/2011 Nookala ................. H04L 47/10
370/329
9,629,026 B2 * 4/2017 Nagasaka ............ H04W 28/08
(Continued)

FOREIGN PATENT DOCUMENTS

CN       103096474 A    5/2013
CN       103379590 A    10/2013
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-347.
(Continued)

*Primary Examiner* — Edan Orgad
*Assistant Examiner* — Vanneilian Lalchinthang
(74) *Attorney, Agent, or Firm* — Murphy, Bilak & Homiller, PLLC

(57) ABSTRACT

A node of a RAN of a wide area cellular network initiates aggregation of WLAN traffic and cellular network traffic for a user equipment. The node determines to initiate aggregation of WLAN traffic and cellular network traffic for the user
(Continued)

(a) PDCP aggregation (b) RLC aggregation (c) MAC aggregation equipment and signals to a node of the WLAN network or the user equipment that aggregation should be initiated for the user equipment. Data is exchanged with the user equipment via a cellular radio link and using an interface between the RAN node and the WLAN node, where the traffic data on the interface is aggregated with the traffic data on the cellular radio link.

19 Claims, 22 Drawing Sheets

(51) Int. Cl.
*H04W 76/16* (2018.01)
*H04W 84/12* (2009.01)
*H04W 88/06* (2009.01)
*H04W 92/10* (2009.01)
*H04W 88/08* (2009.01)

(58) Field of Classification Search
USPC .................................................. 370/254
See application file for complete search history.

(56) References Cited

U.S. PATENT DOCUMENTS

| | | | | |
|---|---|---|---|---|
| 2013/0196661 | A1* | 8/2013 | Lee | H04W 48/18 455/434 |
| 2013/0242897 | A1* | 9/2013 | Meylan | H04W 28/16 370/329 |
| 2014/0079022 | A1 | 3/2014 | Wang et al. | |
| 2014/0274031 | A1 | 9/2014 | Menendez | |
| 2014/0369329 | A1* | 12/2014 | Lee | H04W 28/06 370/338 |
| 2015/0092743 | A1* | 4/2015 | Ji | H04W 76/026 370/331 |
| 2015/0296415 | A1* | 10/2015 | Ling | H04L 69/08 370/329 |
| 2015/0373607 | A1* | 12/2015 | Zhu | H04W 36/22 370/331 |
| 2016/0234726 | A1* | 8/2016 | Nuggehalli | H04W 36/0022 |
| 2016/0380962 | A1* | 12/2016 | Johnson | H04W 88/16 370/328 |
| 2017/0367141 | A1* | 12/2017 | Nagasaka | H04W 76/16 |

FOREIGN PATENT DOCUMENTS

| | | |
|---|---|---|
| CN | 103782622 A | 5/2014 |
| CN | 105230068 A | 1/2016 |
| EP | 2811779 A1 | 12/2014 |
| WO | 2014052850 A1 | 4/2014 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.0.0, Mar. 2014, 1-34.

3GPP, "3rd Generation Partnership Project; Technical Specification Group Radio Access Network; Study on Multi-RAT joint coordination (Release 13)", 3GPP TR 37.870 V0.4.0, Oct. 2014, 1-18.

Unknown, Author, "New SI Proposal: LTE-WLAN Radio Level Integration", 3GPP TSG RAN Meeting #66, RP-141964, Intel Corporation, Qualcomm Incorporated, Maui, USA, Dec. 8-11, 2014, 1-7.

Unknown, Author, "New SI Proposal: LTE-WLAN Radio Level Integration and interworking enhancement", 3GPP TSG RAN Meeting #67, RP-150262, Intel Corporation, China Telecom, Qualcomm Incorporated, Shanghai, China, Mar. 9-12, 2015, 1-9.

Unknown, Author, "Way forward on Multi-RAT Joint Coordination", 3GPP TSG-RAN3 Meeting #84, R3-141512, CMCC, Seoul, Korea, May 19-23, 2014, 1-3.

* cited by examiner

METHOD AND APPARATUS FOR TRAFFIC AGGREGATION SETUP BETWEEN WLAN AND 3GPP

TECHNICAL FIELD

The present invention generally relates to wireless communication networks, and particularly relates to initiating aggregation between cellular and WLAN networks.

BACKGROUND

The wireless local area network (WLAN) technology known as "Wi-Fi" has been standardized by IEEE in the 802.11 series of specifications. The IEEE 802.11 specifications regulate the functions and operations of the Wi-Fi access points (APs) or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Wi-Fi is commonly used as wireless extensions to fixed broadband access, e.g., in domestic environments and in so-called hotspots, like airports, train stations and restaurants.

3GPP/WLAN Interworking

Most current Wi-Fi/WLAN deployments are totally separate from mobile networks, and can be seen as non-integrated from the terminal perspective. Most operating systems (OSs) for user equipments (UEs), such as Android™ and iOS® operating systems, support a simple Wi-Fi offloading mechanism where a UE immediately switches all its IP traffic to a Wi-Fi network upon a detection of a suitable network with a received signal strength above a certain level. Hereinafter, the decision to offload to a Wi-Fi or not is referred to as access selection strategy and the term "Wi-Fi-if-coverage" is used to refer to the aforementioned strategy of selecting Wi-Fi whenever such a network is detected.

There are several drawbacks to the "Wi-Fi-if-coverage" strategy. Though the user/UE can save previous pass codes for already accessed Wi-Fi Access Points (APs), a hotspot login for previously non-accessed APs usually requires user intervention, either by entering the pass code in a Wi-Fi Connection Manager (CM) or using a web interface.

It is recognized herein that no consideration of expected user experience is made except those considered in UE-implemented proprietary solutions. This can lead to a UE being handed over from a high data rate mobile network connection to a low data rate Wi-Fi connection. Even though the UE's OS or some high level software is smart enough to make the offload decisions only when the signal level on the Wi-Fi is considerably better than the mobile network link, there can still be limitations on the backhaul of the Wi-Fi AP that may end up being the bottleneck.

It is also recognized herein that no consideration of the load conditions in the mobile network and Wi-Fi are made. As such, the UE might still be offloaded to a Wi-Fi AP that is serving several UEs while the mobile network (e.g. LTE) that it was previously connected to is rather unloaded.

Interruptions of on-going services can occur due to the change of IP address when the UE switches to the Wi-Fi network. For example, a user who started a Voice over IP (VoIP) call while connected to a mobile network is likely to experience a call drop when arriving home, where the UE switches to the Wi-Fi network automatically. Though some applications are smart enough to handle this switch and survive the IP address change (e.g. Spotify® application), the majority of current applications do not survive the switch. This places a burden on application developers, when they have to ensure service continuity.

Typically, no consideration of the UE's mobility is made in offloading decisions. Therefore, a fast moving UE can end up being offloaded to a Wi-Fi AP for a short duration, only to be quickly handed back over to the mobile network. This is especially a problem in scenarios like cafes with open Wi-Fi, where a user walking by or even driving by the cafe might be affected. Such ping-ponging between the Wi-Fi and mobile network can cause service interruptions as well as generate considerable unnecessary signaling (e.g. towards authentication servers).

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies (RATs). Cellular operators that are currently serving mobile users with, for example, any of the technologies standardized by the $3^{rd}$-Generation Partnership Project (3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users in their regular cellular networks. The term "operator-controlled Wi-Fi," as used herein, points to a Wi-Fi deployment that on some level is integrated with a cellular network operators existing network and where the 3GPP radio access networks and the Wi-Fi wireless access point may even be connected to the same core network and provide the same services.

There is intense activity in the area of operator-controlled Wi-Fi in several standardization organizations. In 3GPP, activities to connect Wi-Fi access points to the 3GPP-specified core network are being pursued. Also, in the Wi-Fi alliance (WFA), activities related to certification of Wi-Fi products are undertaken, which are to some extent also driven from the need to make Wi-Fi a viable wireless technology for cellular operators, to support high bandwidth offerings in their networks. The term "Wi-Fi offload" is commonly used and refers to cellular network operators seeking to offload traffic to Wi-Fi. Wi-Fi offload may take place, for example, in peak-traffic-hours and in situations when the cellular network for one reason or another needs to be off-loaded, e.g., to provide requested quality of service, to maximize bandwidth or simply to provide coverage. While the term "Wi-Fi" has been used above, the remaining description will use the term "WLAN", which is meant to include Wi-Fi.

RAN Level Integration in Rel-12

3GPP is currently working on specifying a feature/mechanism for WLAN/3GPP radio interworking that improves operator control with respect to how a UE performs access selection and traffic steering between 3GPP and WLANs belonging to the operator or its partners. It has been discussed, that for this mechanism, the Radio Access Network (RAN) provides assistance parameters that help the UE in the access selection. The RAN assistance information is composed of three main components, namely threshold values, offloading preference indicator (OPI) and WLAN identifiers. The UE is also provided with RAN rules/policies that make use of these assistance parameters.

The threshold values could be, for example, for metrics such as 3GPP signal related metrics Reference Signal Received Power (RSRP)/Reference Signal Received Quality (RSRQ)/Received Signal Code Power (RSCP)/energy per chip divided by total power noise density (EcNo), WLAN signal related metrics such as RCPI/RSSI, WLAN load/utilization, WLAN backhaul load/capacity, etc. One example of a RAN rule that uses the threshold value could be that the UE should connect to a WLAN if the RSRP is below the signaled RSRP threshold at the same time as the WLAN RCPI is above the signaled RCPI threshold (it is also discussed that the RAN should provide thresholds for when the UE should steer traffic back from WLAN to 3GPP). The RAN rules/policies are expected to be specified in a 3GPP specification such as TS 36.304 v12.0.0 and/or TS 36.331 v12.1.0.

With the above mechanism, it is likely not wanted, or maybe not even feasible, that the terminal considers every WLAN when deciding where to steer traffic. For example, it may not be feasible that the terminal uses this mechanism to decide to steer traffic to a WLAN not belonging to the operator. Hence, it has been proposed that the RAN should also indicate to the terminal the WLANs to which the mechanism should be applied, by sending WLAN identifiers.

The RAN may also provide additional parameters that are used in access network discovery and selection function (ANDSF) policies. One proposed parameter is an offloading preference indicator (OPI). One possibility for OPI is for it to be compared to a threshold in the ANDSF policy to trigger different actions. Another possibility is that OPI is used as a pointer to point, and select, different parts of the ANDSF policy which would then be used by the terminal.

The RAN assistance parameters (e.g., thresholds, WLAN identifiers, OPI) provided by a RAN may be provided with dedicated signaling and/or broadcast signaling. Dedicated parameters can only be sent to the terminal when having a valid Radio Resource Control (RRC) connection to the 3GPP RAN. A terminal that has received dedicated parameters applies dedicated parameters; otherwise, the terminal applies the broadcast parameters. If no RRC connection is established between the terminal and the RAN, the terminal cannot receive dedicated parameters.

In 3GPP, it has been agreed that ANDSF should be enhanced for release-12 to use the thresholds and OPI parameters that are communicated by the RAN to the UE, and that if enhanced ANDSF policies are provided to the UE, the UE will use the ANDSF policies instead of the RAN rules/policies (i.e., ANDSF has precedence).

Tight Integration Between 3GPP and WLAN

Within the scope of 3GPP Release-13, there has been a growing interest in realizing even tighter integration/aggregation between 3GPP-specified networks and WLAN (for example in "LTE-WLAN Radio Level Integration and Interworking Enhancement", 3GPP RP-150262). For example, just as for carrier aggregation between multiple carriers in 3GPP, tighter integration/aggregation between 3GPP and WLAN means that the WLAN is used as just another carrier for the terminal device. Such an aggregation is expected to make it possible for a more optimal aggregation opportunity as compared to multipath transmission control protocol (MPTCP), as the aggregation is performed at a lower layer and as such, the scheduling and flow control of the data on the WLAN and 3GPP links can be controlled by considering dynamic radio network conditions. The term "tight aggregation" is used in this document to refer to the aggregation of at least one carrier in the 3GPP network and at least one carrier in the WLAN, i.e., aggregation of carriers through networks operating according to different RATs. Alternative terms for "tight aggregation" include "radio level aggregation" and "lower layer aggregation".

FIG. 1 illustrates the protocol stack of a UE with three different protocol options of aggregation: at the packet data convergence protocol (PDCP) level (FIG. 1(a)), radio link protocol (RLC) level (FIG. 1(b)) and medium access control (MAC) level (FIG. 1(c)). In each option of FIG. 1, the bottom group of protocol layers includes several WLAN protocol layers (802.11 PHY, 802.11 MAC, and 802.11 LLC), as well as one or more 3GPP-only layers (e.g., PHY, MAC, RLC) and one or more integrated/aggregated layers (e.g., PDCP, RLC). The figure shows the main principles for these three aggregation levels and additional functionality that may be needed. For example, in the PDCP-level aggregation, an additional protocol layer may be used between the PDCP layer and the 802.2 LLC (logical link control) layer to convey information about the UE and the radio bearer the traffic is associated with (this additional protocol layer is shown as "Glue-1" in FIGS. 2A and 2B). Note that FIG. 1 is showing the protocol stack at a UE with media layers 15, a transport layer 13 and an application layer 11.

In the case of a standalone AP and a radio base station such as an eNodeB or eNB (i.e., where the AP and eNB are not co-located), the protocol stack for supporting aggregation is a little bit different, as the LLC frames have to now be relayed towards the standalone eNB. FIG. 2A illustrates this for the case of PDCP level aggregation. In this case, once the LLC packet is decoded at the AP (in the uplink direction from the UE to the AP), and the AP realizes that this packet is a PDCP packet that has to be routed to an eNB, the forwarding can be performed via the normal TCP/IP protocol stack. FIG. 2B shows PDCP level aggregation with a co-located/combined eNB and AP.

A study item entitled Multi-RAT Joint Coordination has been recently started in 3GPP TSG RAN3. At RAN3 #84 the scope and requirements for the Multi-RAT Joint Coordination SI were further defined. In particular, for the 3GPP-WLAN coordination part, it was agreed to focus on non-integrated 3GPP/WLAN nodes since integrated nodes are a matter of implementation.

Among the requirements of the study item PGPP TR 37.8701 is the investigation of potential enhancements of RAN interfaces and procedures to support the joint operation among different RATs, including WLAN. It has also been agreed that i) the coordination involving WLAN and 3GPP is in the priority of the study item, and ii) the statements on 3GPP/WLAN must be complementary to RAN2 work [R3-141512]. This complement could be achieved by the specification of an interface between the E-UTRAN and WLAN, which may occur in future releases. Such an architecture is shown in FIG. 3. The interface between the WLAN AP and the eNB is referred to as an Xw interface from here onwards.

When it comes to aggregation, the Xw interface can be used not only for forwarding the aggregated data, but also for control plane signaling regarding the aggregation. Note that for the case of co-located APs and eNBs, a proprietary interface could be employed for the provision of similar functionalities.

The control plane protocol architecture between the UE and eNB (for the case of WLAN related control signaling) and also between the eNB and WLAN AP are illustrated in FIG. 4. The eNB can configure the settings of some of the UE's WLAN parameters and behavior via RRC signaling. On the other hand, as shown in FIG. 5, the eNodeB uses the XwAP application protocol of the Xw interface to configure the WLAN AP.

The aggregation of WLAN and 3GPP at a higher layer by employing mechanisms such as MP-TCP (Multi-Path TCP) has been known for some time, while aggregation between the two networks at a lower layer, as generally described above, is a rather new concept that is gaining a lot of momentum in the industry. A study item proposal has been made in the previous RAN plenary meetings [e.g. RP-141964, RAN meeting #66, December 2014].

As described above, an interworking mechanism between WLAN and 3GPP has been standardized. However, only the concept of interworking between the two networks has been covered (i.e., though data traffic from/to a given UE can either be provisioned via the WLAN or 3GPP networks, so a specific traffic/flow is associated with only one of the two). Thus, it is recognized herein that new mechanisms are needed in order to setup the aggregation between WLAN and 3GPP, at the UE side and at the network nodes.

SUMMARY

Embodiments of the present invention comprise apparatuses and methods for setting up and enabling the aggregation procedure. In some cases, the aggregation procedure is initiated by the 3GPP network, while in others, it is the WLAN network that initiates the aggregation. The mechanisms described in this invention enable the aggregation of a given user's traffic between WLAN and 3GPP networks. Several different mechanisms for triggering the aggregation procedure are described herein, according to various embodiments.

According to some embodiments, a method, in a node of a RAN of a wide area cellular network, for initiating aggregation of WLAN traffic and cellular network traffic for a user equipment, includes determining to initiate aggregation of WLAN traffic and cellular network traffic for the user equipment and signaling that aggregation should be initiated for the user equipment. The method also includes exchanging first user traffic data with the user equipment using an interface between the node and a node of a WLAN network and exchanging second user traffic data with the user equipment via a cellular radio link, where the first user traffic data on the interface is aggregated with the second user traffic data on the cellular radio link. The WLAN node may be an AP or an access point controller (AC).

According to some embodiments, a method, in a user equipment of a wide area cellular network, for initiating aggregation of WLAN traffic and cellular network traffic for the user equipment includes receiving an indication to initiate aggregation towards a node of a WLAN network and preparing to initiate aggregation responsive to the indication. The method also includes exchanging first user traffic data with a node of a RAN of the wide area cellular network and second user traffic data with the WLAN node, where the first user traffic data on the interface is aggregated with the second user traffic data on the cellular radio link.

According to some embodiments, a method, in a node of a WLAN network, for initiating aggregation of WLAN traffic and cellular network traffic for a user equipment, includes receiving an indication to initiate aggregation. The method also includes, in response to the indication, forwarding first user traffic data received from the user equipment to a node in a RAN of a wide-area cellular network and forwarding second user traffic data received from the RAN node to the user equipment, where the first user traffic data on the interface is aggregated with the second user traffic data on the cellular radio link.

According to some embodiments, a method, in a network node of a wide area cellular network, for initiating aggregation of WLAN traffic and cellular network traffic for a user equipment includes determining to initiate aggregation of WLAN traffic and cellular network traffic for the user equipment and signaling that aggregation should be initiated for the user equipment.

Other embodiments include apparatus, computer program products, computer readable medium and functional embodiments that perform the operations of the method claims.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
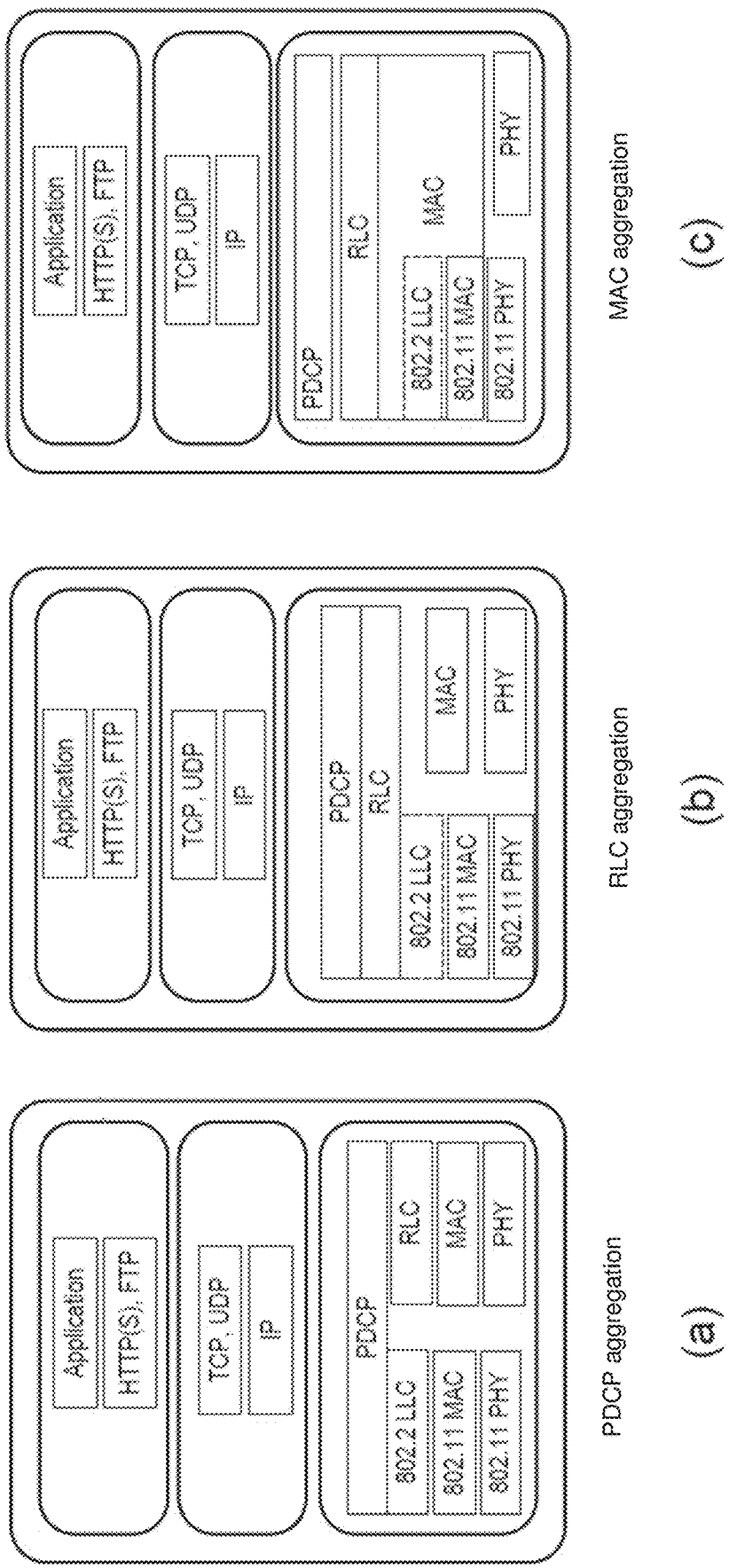
FIG. 1 is a diagram of different levels of tight integration/aggregation between 3GPP and WLAN.
Figure 2A:
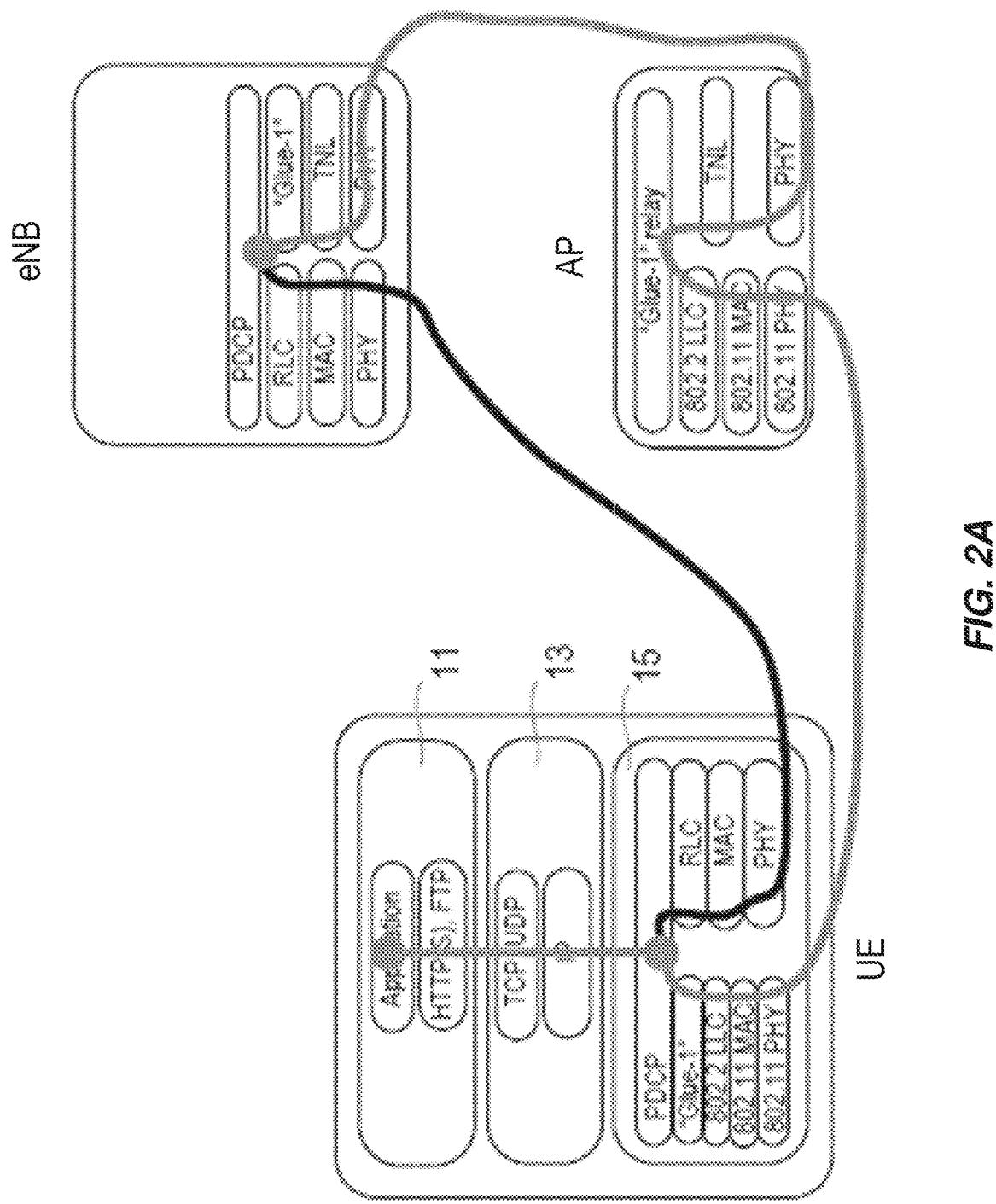
FIG. 2A illustrates PDCP level aggregation with a stand-alone AP and an eNodeB.
Figure 2B:
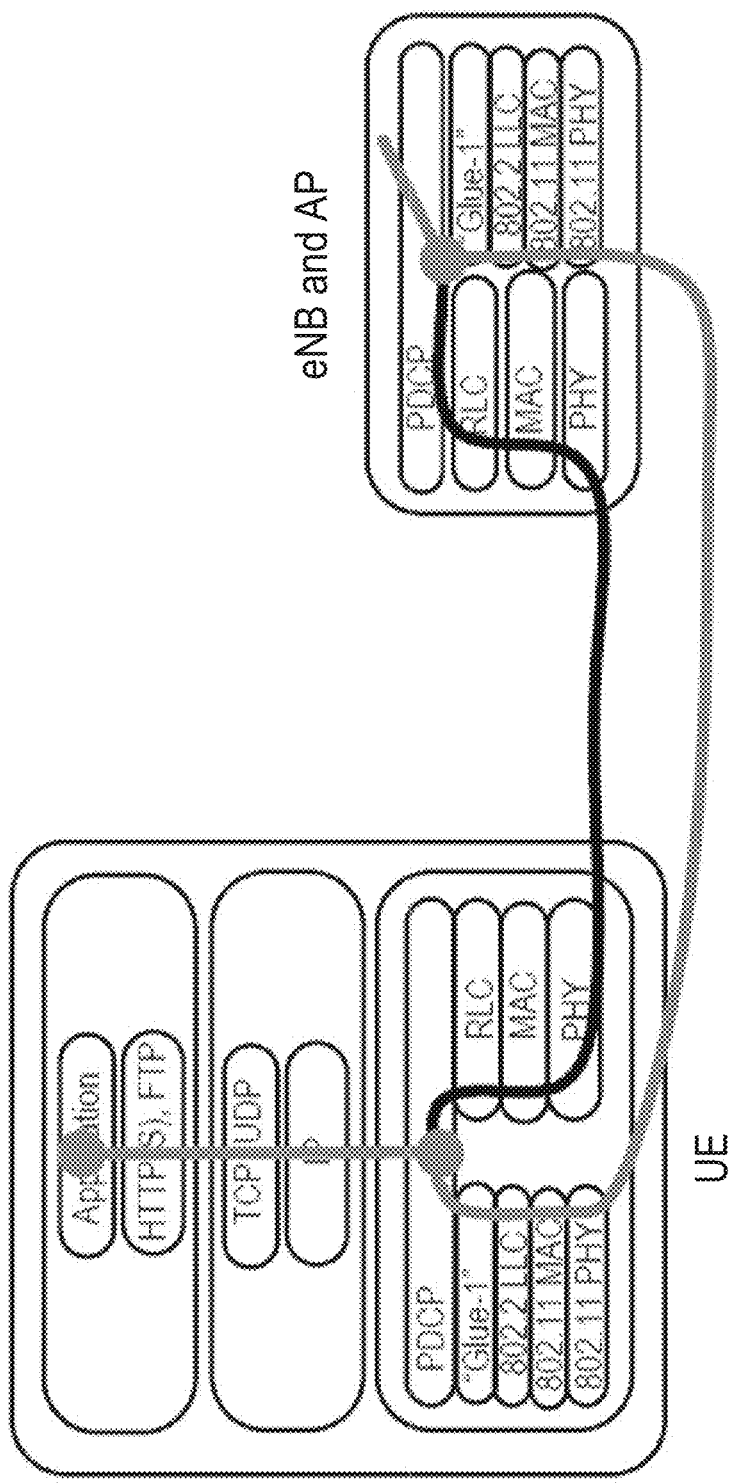
FIG. 2B illustrates PDCP level aggregation with a co-located/combined eNodeB and AP.
Figure 3:
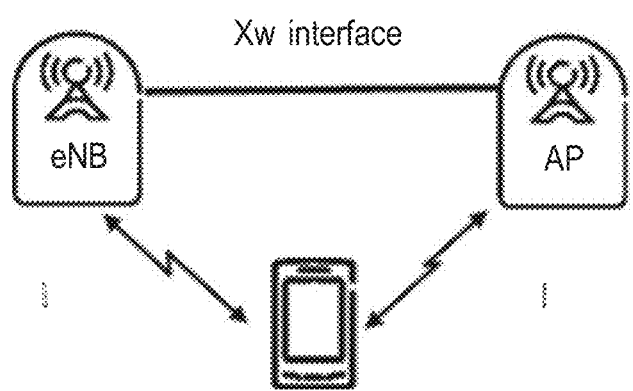
FIG. 3 illustrates carrier aggregation between an eNodeB and a WLAN AP.
Figure 4:
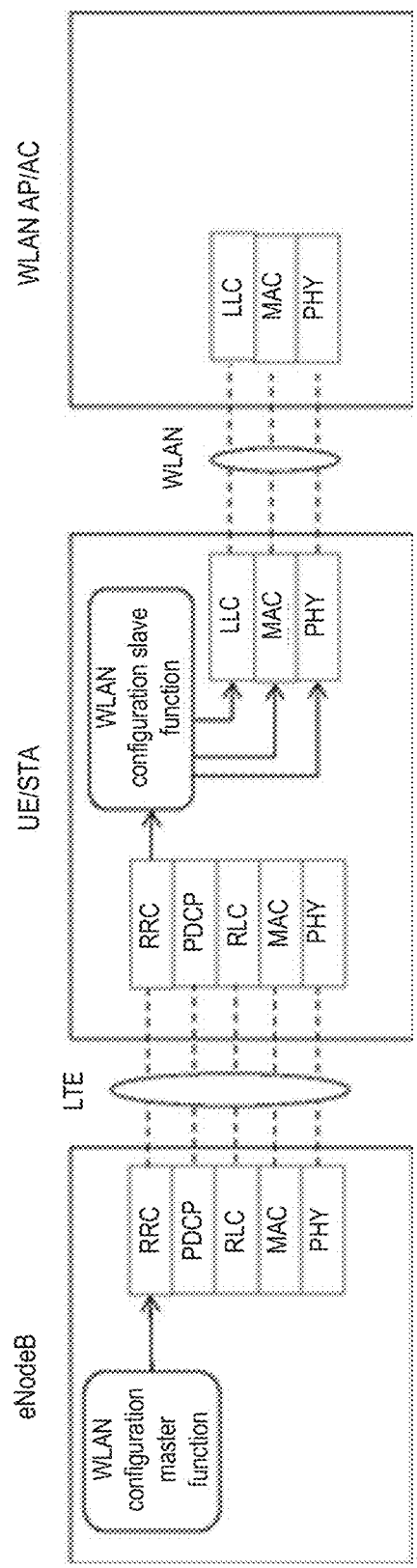
FIG. 4 illustrates a block diagram of a protocol stack in UE, eNodeB, WLAN AP for configuring UE WLAN behavior from the eNodeB.
Figure 5:
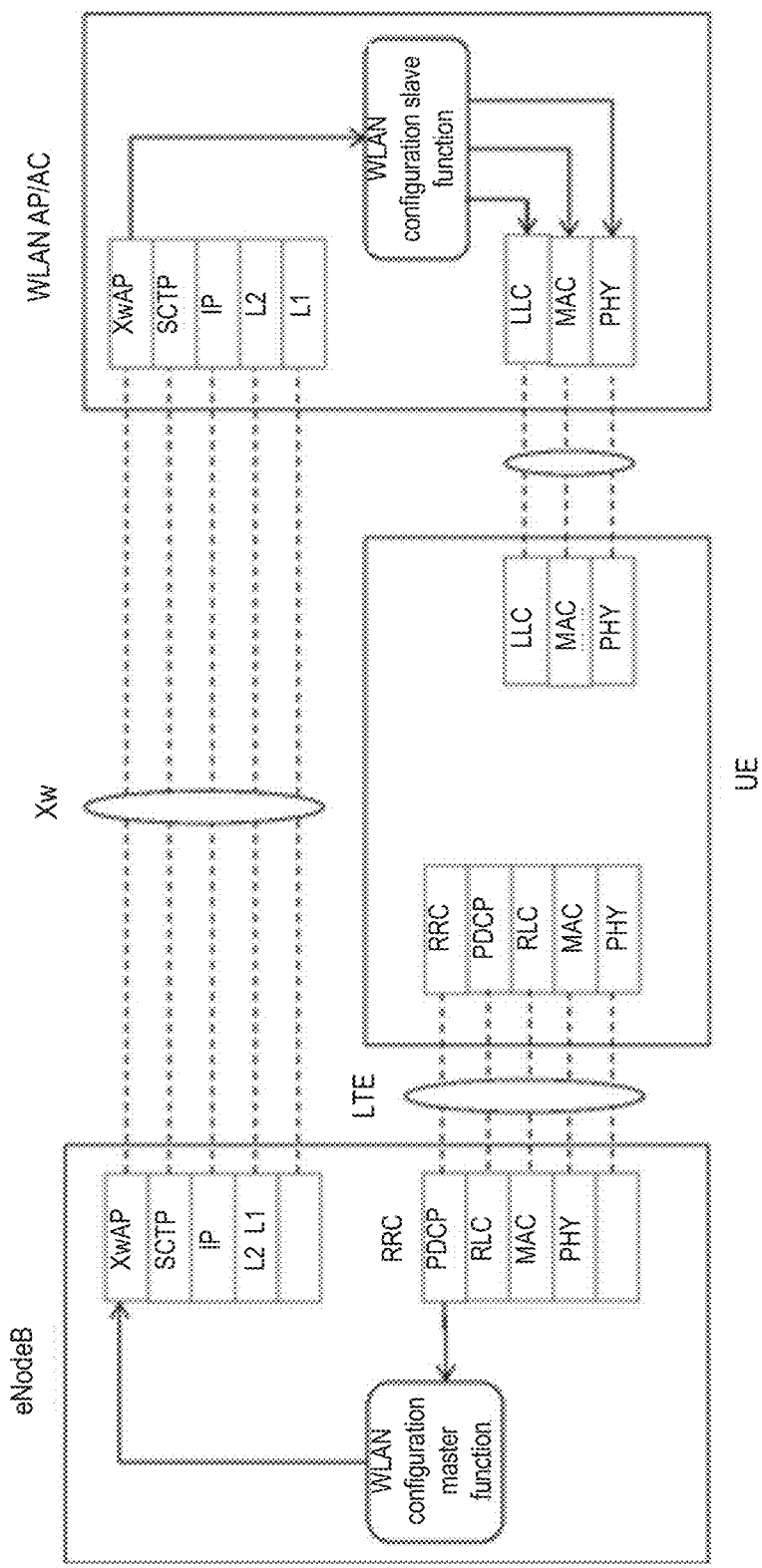
FIG. 5 illustrates a block diagram of a protocol stack in UE, eNodeB, WLAN AP/AC for configuring WLAN AP/AC behavior from the eNodeB.
Figure 6:
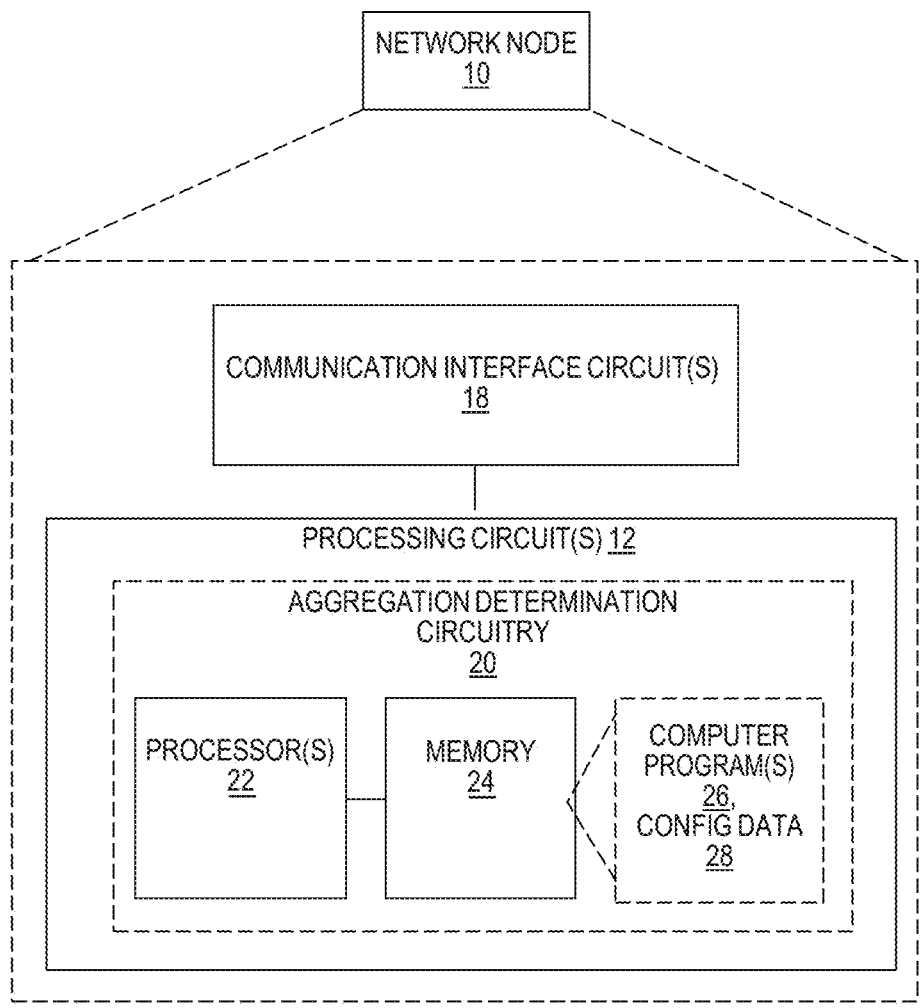
FIG. 6 illustrates a block diagram of a network node configured to initiate aggregation between a cellular network and a WLAN network, according to some embodiments.

FIG. 6 illustrates a diagram of a network node 10, according to some embodiments. The network node 10 resides in the core network and facilitates communication between access networks and the Internet using communication interface circuit 18. The communication interface circuit 18 includes circuitry for communicating with other nodes in the core network, radio nodes, and/or other types of nodes in the network for the purposes of providing data and cellular communication services. According to various embodiments, cellular communication services may be operated according to any one or more of the 3GPP cellular standards, GSM, GPRS, WCDMA, HSDPA, LTE and LTE-Advanced.

The network node 10 also includes one or more processing circuits 12 that are operatively associated with the communication interface circuit 18. For ease of discussion, the one or more processing circuits 12 are referred to hereafter as "the processing circuit 12". The processing circuit 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 12 may comprise fixed circuitry, or programmable circuitry that is specially configured via the execution of program instructions implementing the functionality taught herein, or may comprise some mix of fixed and programmed circuitry. The processor 22 may be multi-core having two or more processor cores utilized for enhanced performance, reduced power consumption, and more efficient simultaneous processing of multiple tasks.

The processing circuit 12 also includes a memory 24. The memory 24, in some embodiments, stores one or more computer programs 26 and, optionally, configuration data 28. The memory 24 provides non-transitory storage for the computer program 26 and it may comprise one or more types of computer-readable media, such as disk storage, solid-state memory storage, or any mix thereof. By way of non-limiting example, the memory 24 comprises any one or more of SRAM, DRAM, EEPROM, and FLASH memory, which may be in the processing circuit 12 and/or separate from the processing circuit 12.

In general, the memory 24 comprises one or more types of computer-readable storage media providing non-transitory storage of the computer program 26 and any configuration data 28 used by the network node 10. Here, "non-transitory" means permanent, semi-permanent, or at least temporarily persistent storage and encompasses both long-term storage in non-volatile memory and storage in working memory, e.g., for program execution.

The processor 22 of the processing circuit 12 may execute a computer program 26 stored in the memory 24 that configures the processor 22 to determine to initiate aggregation of WLAN traffic and cellular network traffic for the user equipment and signal that aggregation should be initiated for the user equipment. This structure and functionality may be referred to as aggregation determination circuitry 20 in the processing circuit 12.

Figure 7:
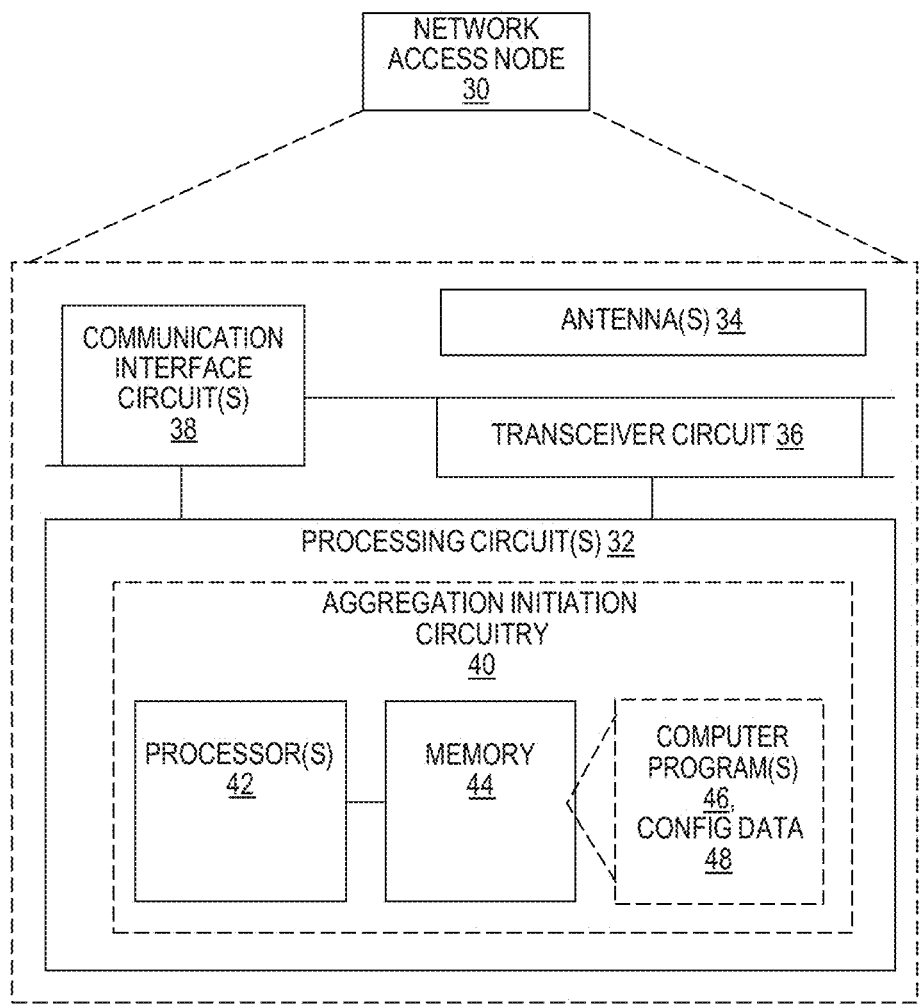
FIG. 7 illustrates a block diagram of a network access node configured to initiate aggregation between a cellular network and a WLAN network, according to some embodiments.

FIG. 7 illustrates a diagram of a network access node 30, such as a node in RAN, a base station or an eNodeB, according to some embodiments. The network access node 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The access network node 30 may also include a communication interface circuit 38 for communicating with nodes in the core network such as the network node 10, other peer radio nodes, and/or other types of nodes in the network, as well as with one or more network nodes in a WLAN, such as one or more WLAN nodes, such as WLAN access points and/or WLAN access controllers.

The network access node 30 also includes one or more processing circuits 32 that are operatively associated with the communication interface circuit 38 and transceiver circuit 36. The processing circuit 32 comprises one or more digital processors 42, e.g., one or more microprocessors, microcontrollers, DSPs, FPGAs, CPLDs, ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the base station 30.

The processor 42 may execute a computer program 46 stored in the memory 44 that configures the processor 42 to determine to initiate aggregation of WLAN traffic and cellular network traffic for the user equipment, signal, via a communication interface and/or a transceiver, that aggregation should be initiated for the user equipment and exchange first user traffic data with the user equipment using an interface between the network access node 30 and a node (e.g., access point) of a WLAN network and exchange second user traffic data with the user equipment via a cellular radio link, where the first user traffic data on the interface is aggregated with the second user traffic data on the cellular radio link. This structure and functionality may be referred to as aggregation initiation circuitry 40 in the processing circuit 32.

Figure 8:
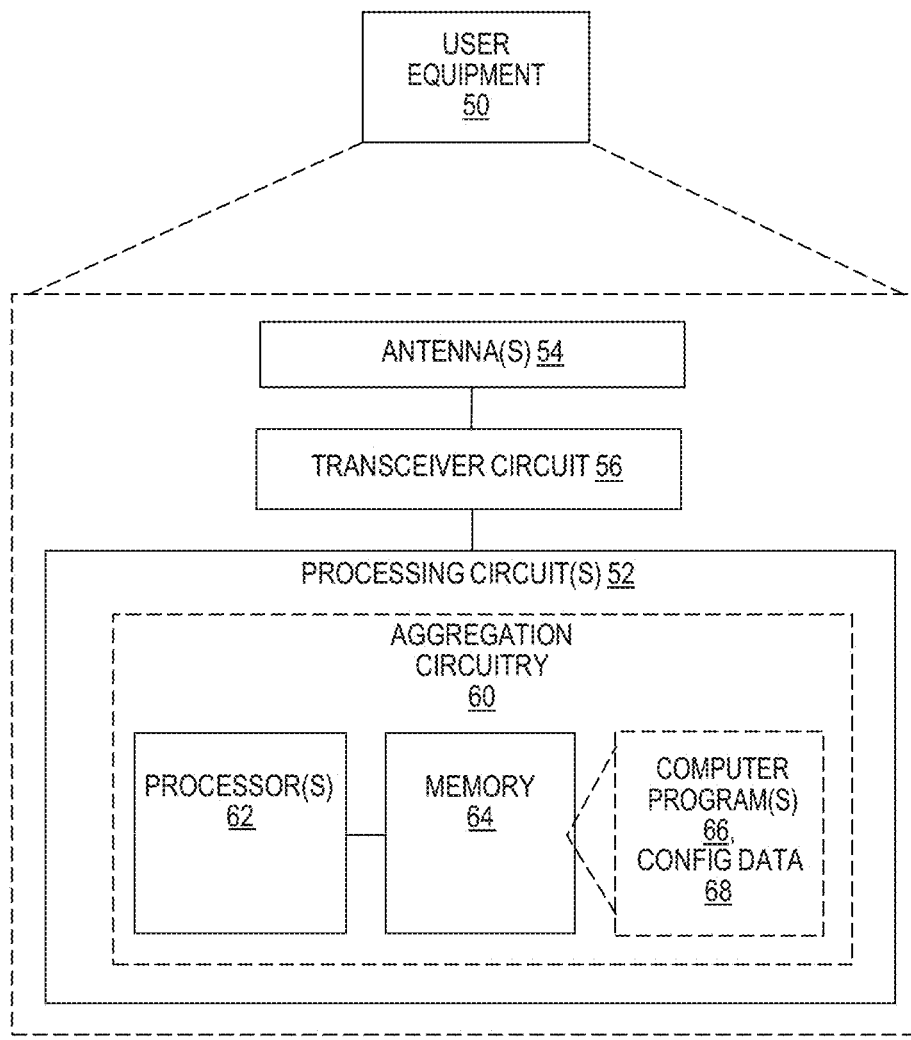
FIG. 8 illustrates a block diagram of a user equipment configured to initiate aggregation between a cellular network and a WLAN network, according to some embodiments.

FIG. 8 illustrates a diagram of a wireless device, such as a user equipment 50, according to some embodiments. The user equipment 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The user equipment 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The processor 62 of the processor circuit 52 may execute a computer program 66 stored in the memory 64 that configures the processor 62 to receive an indication to initiate aggregation towards a node (e.g., an access point) of a WLAN network, prepare to initiate aggregation responsive to the indication and exchange, via the transceiver 56, first user traffic data with a node of a RAN of the wide area cellular network and second user traffic data with the WLAN node, where the first user traffic data on the interface is aggregated with the second user traffic data on the cellular radio link. This functionality may be performed by aggregation circuitry 60 in processing circuit 52.

Figure 9:
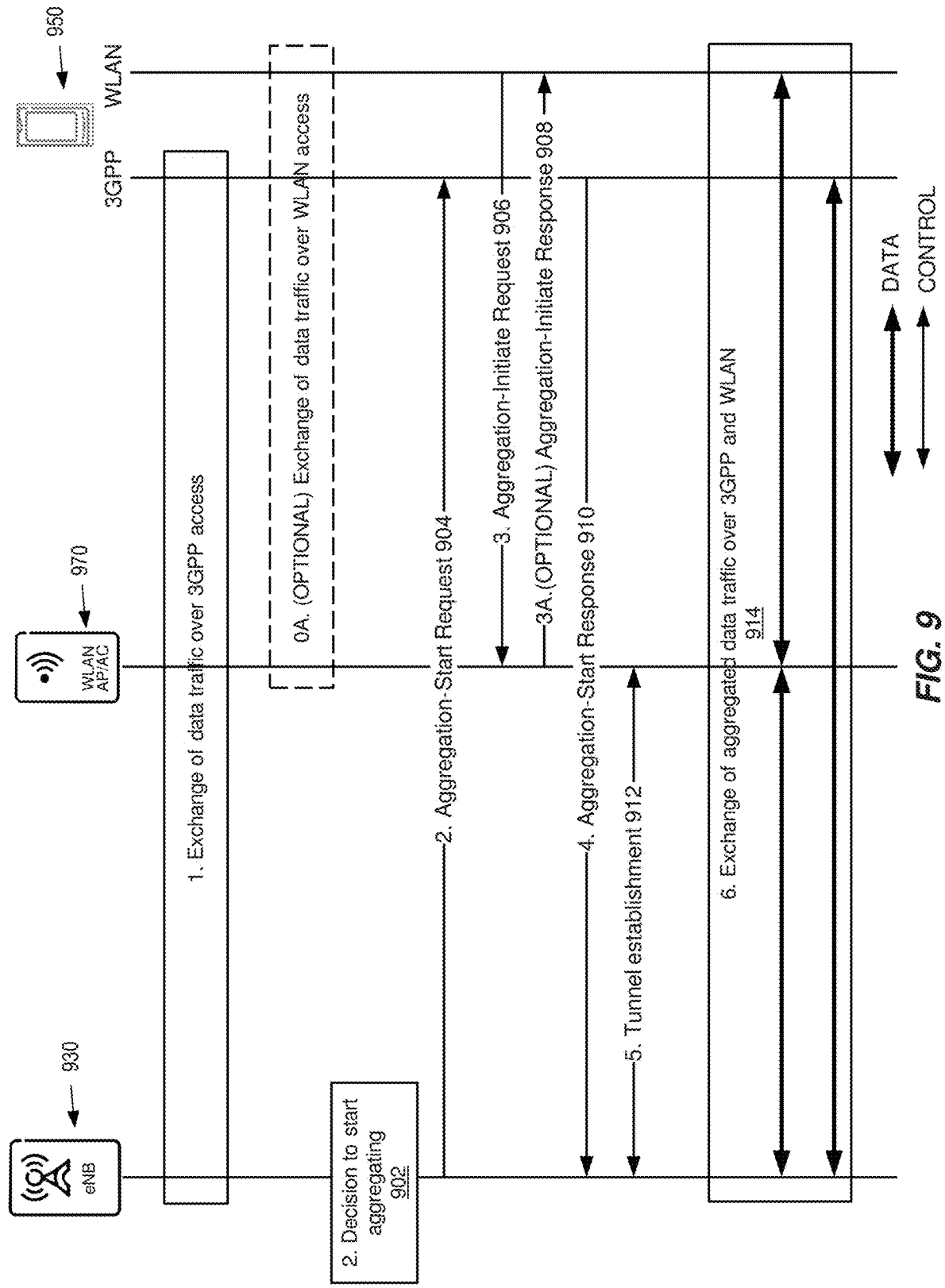
FIG. 9 illustrates a diagram for an eNodeB signaling a UE to initiate aggregation, according to some embodiments.
Figure 10:
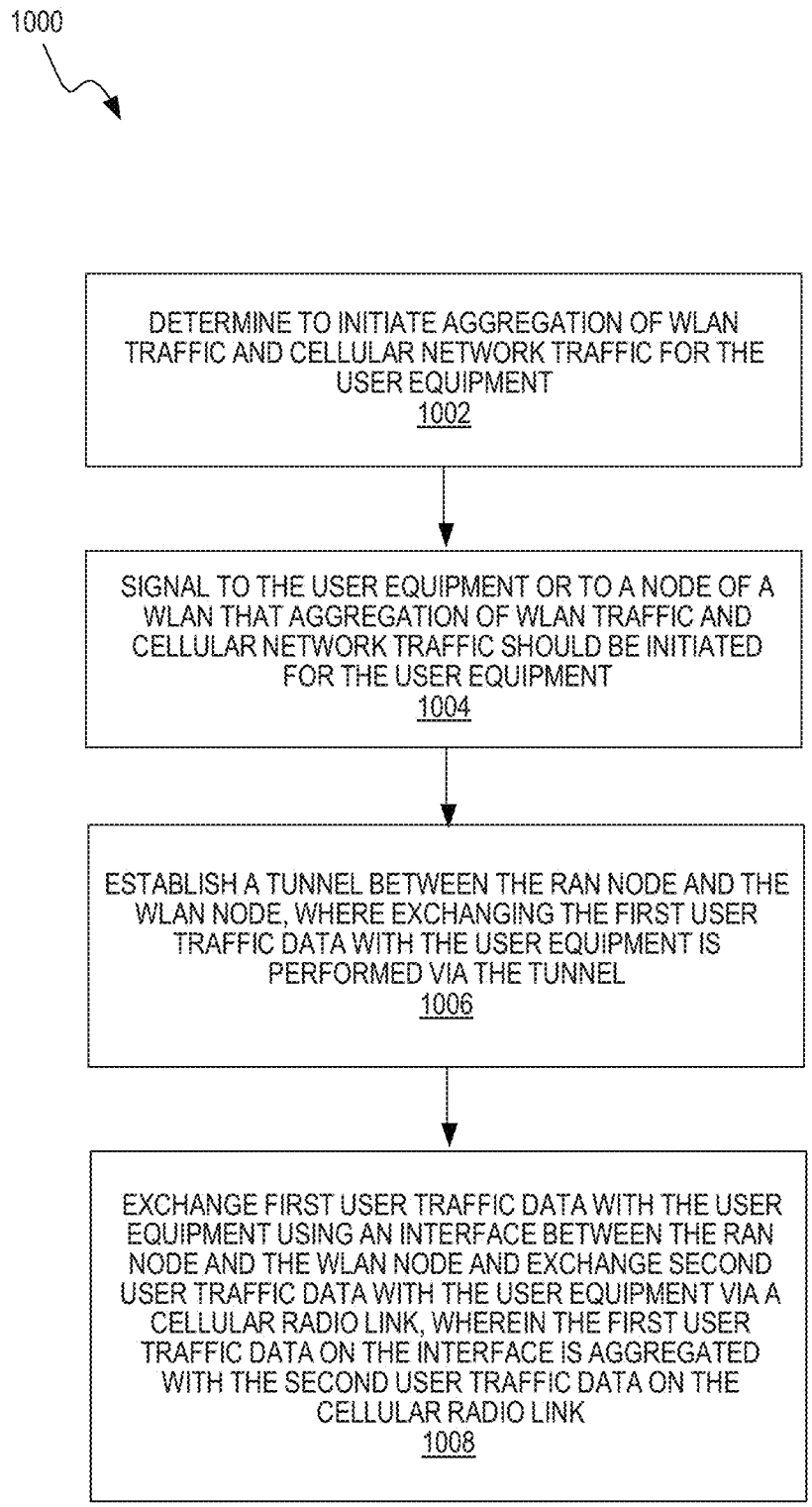
FIG. 10 illustrates a method in a node of a radio access network for initiating aggregation between a cellular network and a WLAN network, according to some embodiments.
Figure 11:
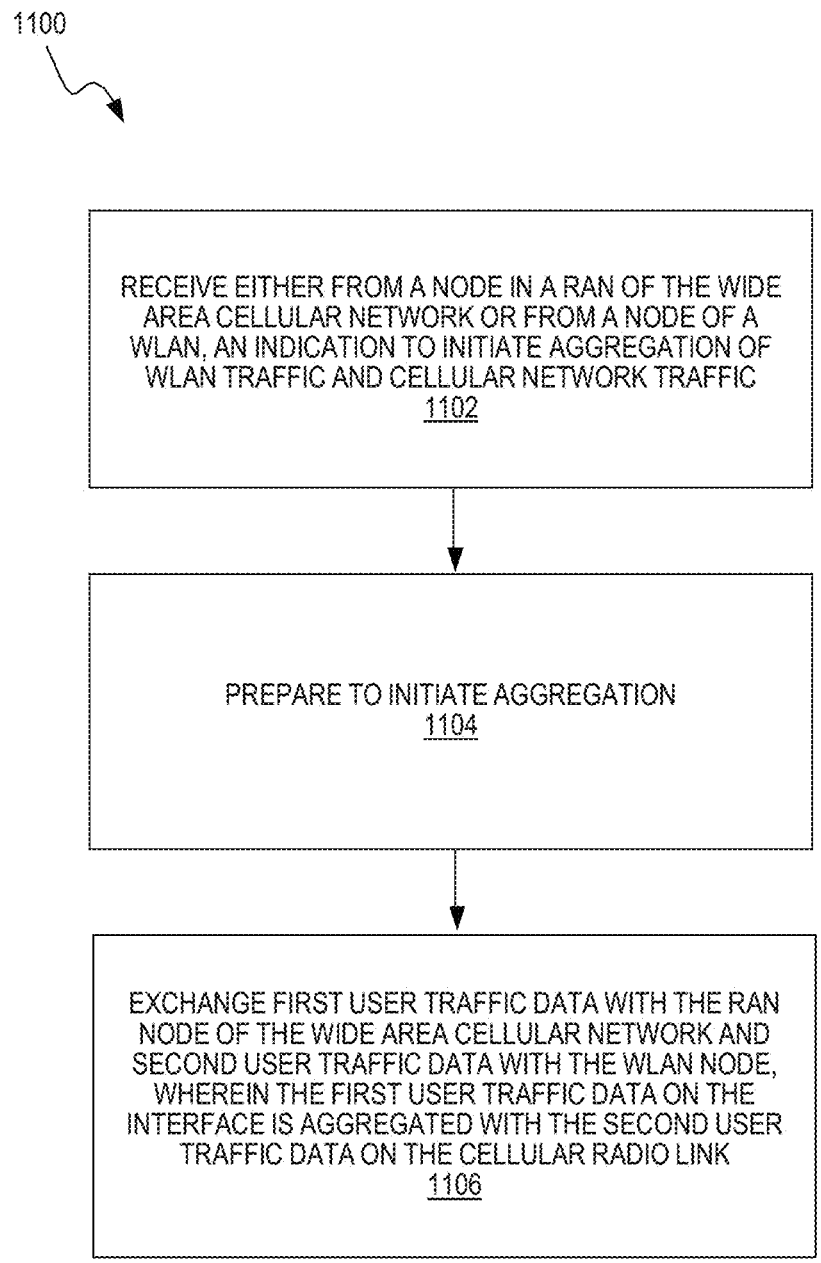
FIG. 11 illustrates a method in a user equipment for initiating aggregation between a cellular network and a WLAN network, according to some embodiments.
Figure 12:
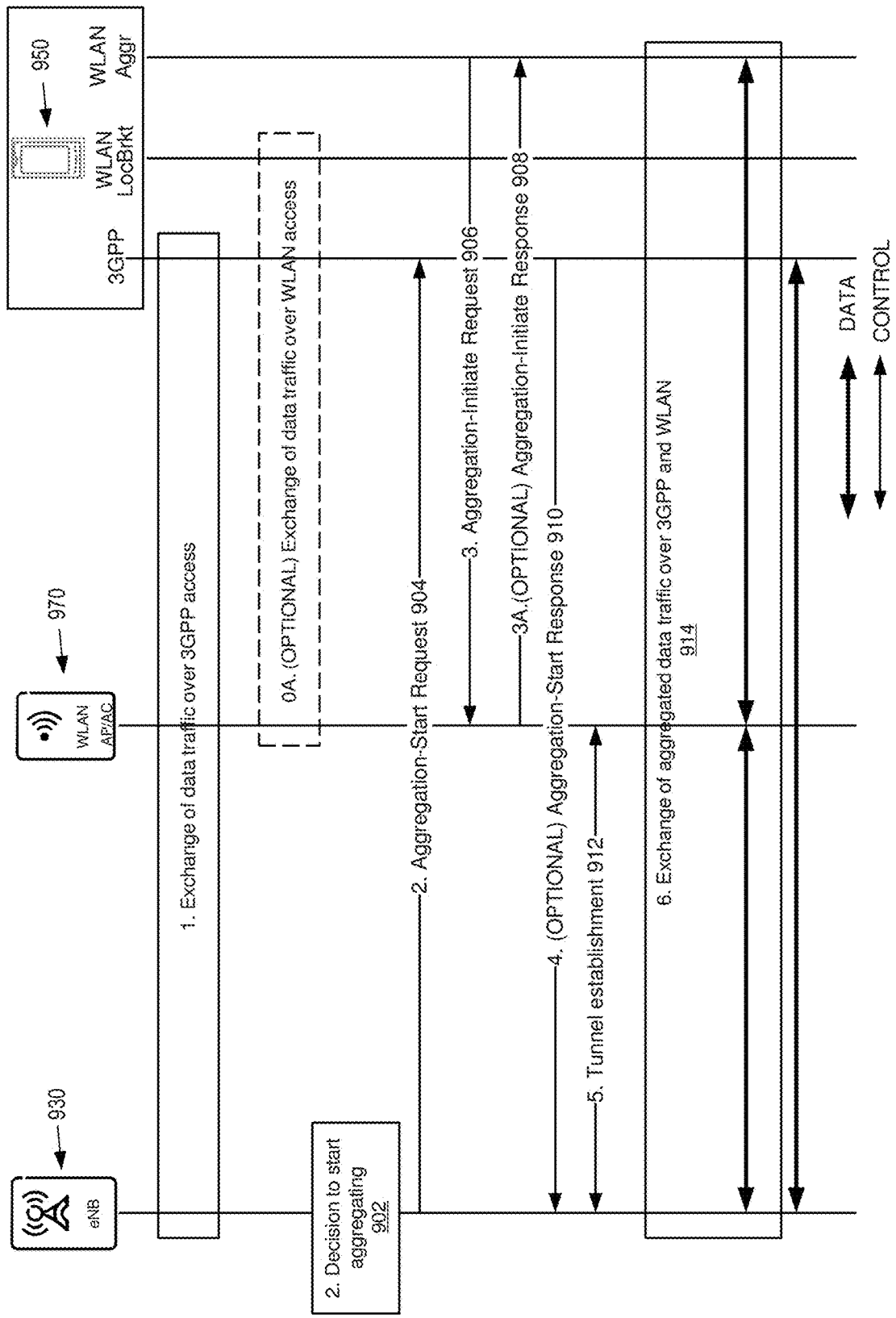
FIG. 12 illustrates a diagram for an eNodeB signaling a UE to initiate aggregation, according to some embodiments.
Figure 13:
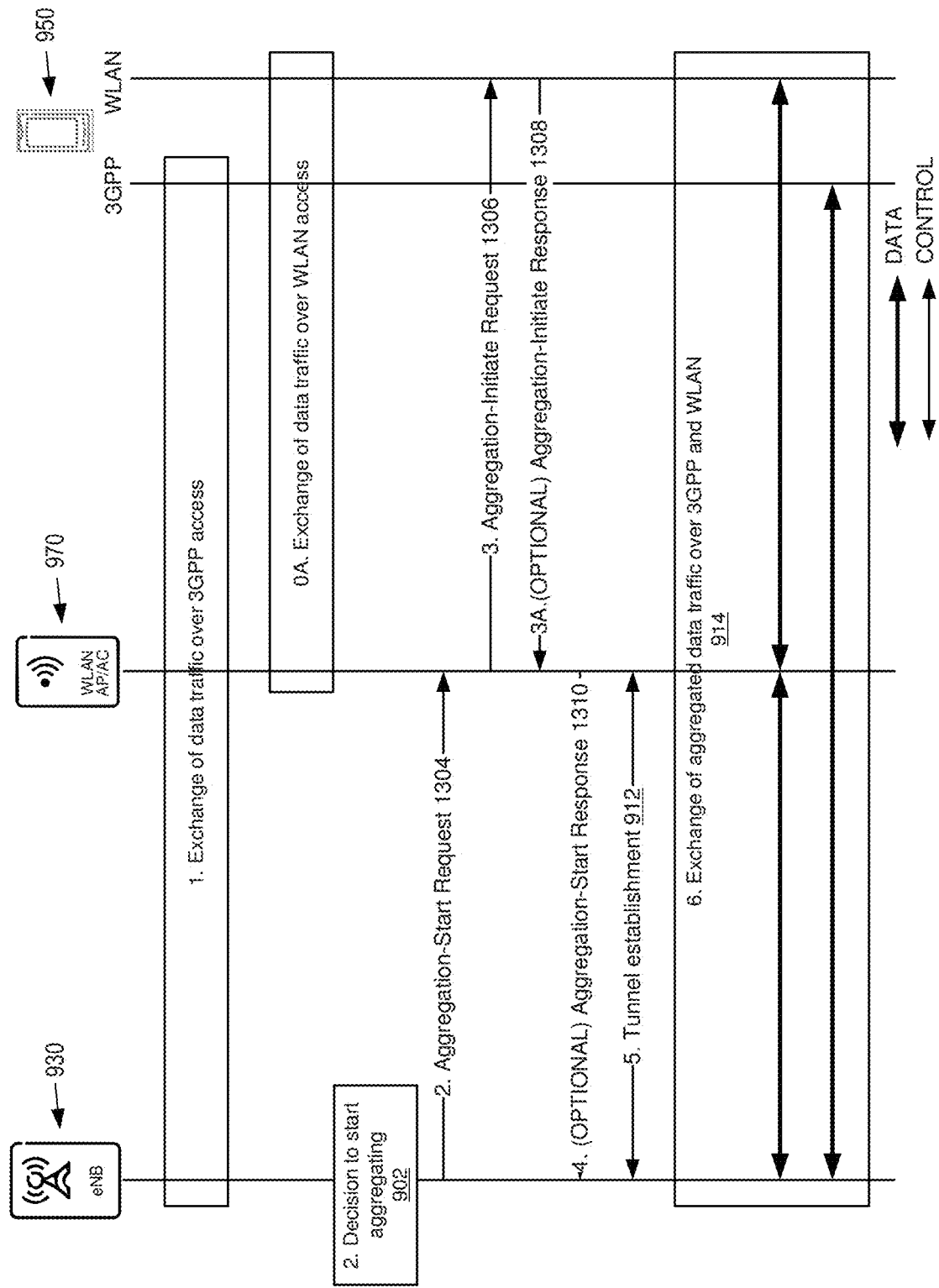
FIG. 13 illustrates a diagram for an eNodeB signaling an access point to initiate aggregation, according to some embodiments.

Several different mechanisms for triggering the aggregation procedure are described herein, according to various embodiments. For example, a 3GPP-controlled eNB→UE signaling that is WLAN side UE-initiated is illustrated by FIG. 9. A 3GPP-controlled eNB→UE signaling that is WLAN side UE-initiated (UE with multiple WLAN interfaces) is illustrated by FIG. 12. A 3GPP-controlled eNB→AP/AC signaling that is WLAN side AP/AC-initiated is illustrated by FIG. 13. A 3GPP-controlled eNB→AP/AC signaling that is WLAN side AP/AC-initiated (UE with multiple WLAN interfaces) is illustrated by FIG. 16. FIGS. 9, 12, 13 and 16 will also be used as context to explain methods 1000, 1100, 1500 and 1700 of FIGS. 10, 11, 15 and 17, respectively.

FIG. 9 shows a 3GPP-controlled eNB 930 signaling to a UE 950 to initiate aggregation. The eNB 930 may be configured as the network access node 30. The aggregation initiation circuitry 40 of the eNB 930 is configured to perform a method, such as method 1000 of FIG. 10, according to some embodiments. The method 1000 includes determining to initiate aggregation of WLAN traffic and cellular network traffic for the UE 950 (block 1002). This determination is shown by decision box 902. The method 1000 may include signaling to the user equipment or to a node of a WLAN that aggregation of WLAN traffic and cellular network traffic should be initiated for the user equipment (block 1004). This can be represented by request 904. The UE 950 may request 906 the node (AP 970) of the WLAN network to initiate aggregation. The AP 970 may provide a response message 908. The UE 950 may also provide a response message 910 to the eNB 930. If an interface or tunnel does not already exist between the eNB 930 and the AP 970, one is created at process 912. The method 1000 also includes exchanging first user traffic data with the UE 950 using an interface between the eNB 930 and the AP 970 and exchanging second user traffic data with the UE 950 via a cellular radio link, where the first user traffic data on the interface is aggregated with the second user traffic data on the cellular radio link (block 1006). This is represented by the traffic flow arrows of process 914. Note that the first and second user traffic data may be for the same application or service, in some instances or embodiments, and may be exchanged simultaneously, in some instances or embodiments. The exchanging may be responsive to receiving a confirmation message from the user equipment or the WLAN node.

The method 1000 may include establishing a tunnel between the RAN node and the WLAN node, and wherein exchanging the first user traffic data with the user equipment is performed via the tunnel.

The signaling may include transmitting, to the user equipment, a message comprising at least one of: a WLAN node identity; an indication of which bearers are to be aggregated; and an indication of a type of aggregation. The signaling may also include transmitting, to the WLAN node, a message comprising at least one of: a WLAN user equipment identity; an indication of which bearers are to be aggregated; and an indication of a type of aggregation.

The determination to initiate aggregation may be based on at least one of: a user equipment WLAN measurement; local load conditions in the node; measured throughput in the RAN; traffic demand per user equipment and/or bearers; a user equipment capability; a user equipment battery level; a user equipment position; and a usage of a given mobile application.

The UE 950 may be configured as described for the UE 50. The aggregation circuitry 60 may be configured to perform a method 1100 for initiating aggregation of WLAN traffic and cellular network traffic for the UE 950, according to some embodiments. The method 1100 includes receiving an indication either from a RAN node (eNB 930) of the wide area cellular network or from a node (AP 970) of a WLAN, an indication to initiate aggregation of WLAN traffic and cellular network traffic (block 1102). The method 1100 also includes preparing to initiate aggregation responsive to the indication (block 1104). Preparing can simply include being ready for aggregation, or for exchanging traffic data on multiple bearers, such as with both the RAN node (eNB 930) and the WLAN node (AP 970). Preparing may include taking any necessary actions to enable aggregation. This may include applying a configuration, preparing to split traffic data, preparing to receive split traffic data and/or sending a response message.

The method 1100 further includes exchanging first user traffic data with the RAN node of the wide area cellular network (eNB 930), and exchanging second user traffic data with the WLAN node (AP 970), where the first user traffic data on the interface is aggregated with the second user traffic data on the cellular radio link (block 1106). The method 1100 may also include determining whether to initiate aggregation and preparing to initiate aggregation in response to a determination to initiate aggregation. For example, the UE 950 can reject a "Start Aggregation" command because it could not find a suitable AP or because of some other UE related reason, like the UE experiencing local interference, the WLAN radio interface being unavailable, the battery level being too low for the resulting power consumption, etc.

The method 1100 may include sending, to the RAN node or WLAN node from which the indication to initiate aggregation was received, a response message corresponding to a result of the determining. The indication to aggregate traffic may be received from the RAN node, and the determination whether to initiate aggregation may be based on a determination of whether suitable WLAN nodes are available for aggregation. The WLAN node may be identified from information in the indication.

In some embodiments, the method 1100 includes activating a WLAN interface at the user equipment for aggregation, connecting to the WLAN node with the WLAN interface, initiating establishment of an interface between the RAN node and the WLAN node for aggregation of control and user plane traffic, and determining traffic that is to be exchanged with the RAN node using a traffic flow template. Determining where to exchange traffic data with the WLAN node and/or the RAN node may include using a traffic flow template and an identity of the WLAN node and/or RAN node.

The UE 950 may have a plurality of physical and logical interfaces, including multiple MAC addresses. The method 1100 may further include selecting ones of the plurality of physical or logical interfaces for signaling and for aggregation. FIG. 12 shows the processes performed using different interfaces. For example, in some embodiments, UE 950 has actually two WLAN radios, one used for aggregation and one for non-aggregated traffic. In the case of a logical aggregation interface, on the other hand, the UE 950 may have only one WLAN radio, but has two virtual interfaces. In both cases, the UE 950 will use two MAC addresses, one for normal traffic and another for aggregated traffic. In the physical aggregation interface case, if the two radios are operating at different frequencies (for example, one operating at 2.4 GHz and another one at 5 GHz), both aggregation and non-aggregation traffic can be physically transmitted at the same time. In the case of the logical interface using only one physical radio, on the other hand, the aggregated and non-aggregated traffic have to be time multiplexed (i.e., cannot be physically transmitted at the same time).

Figure 14:
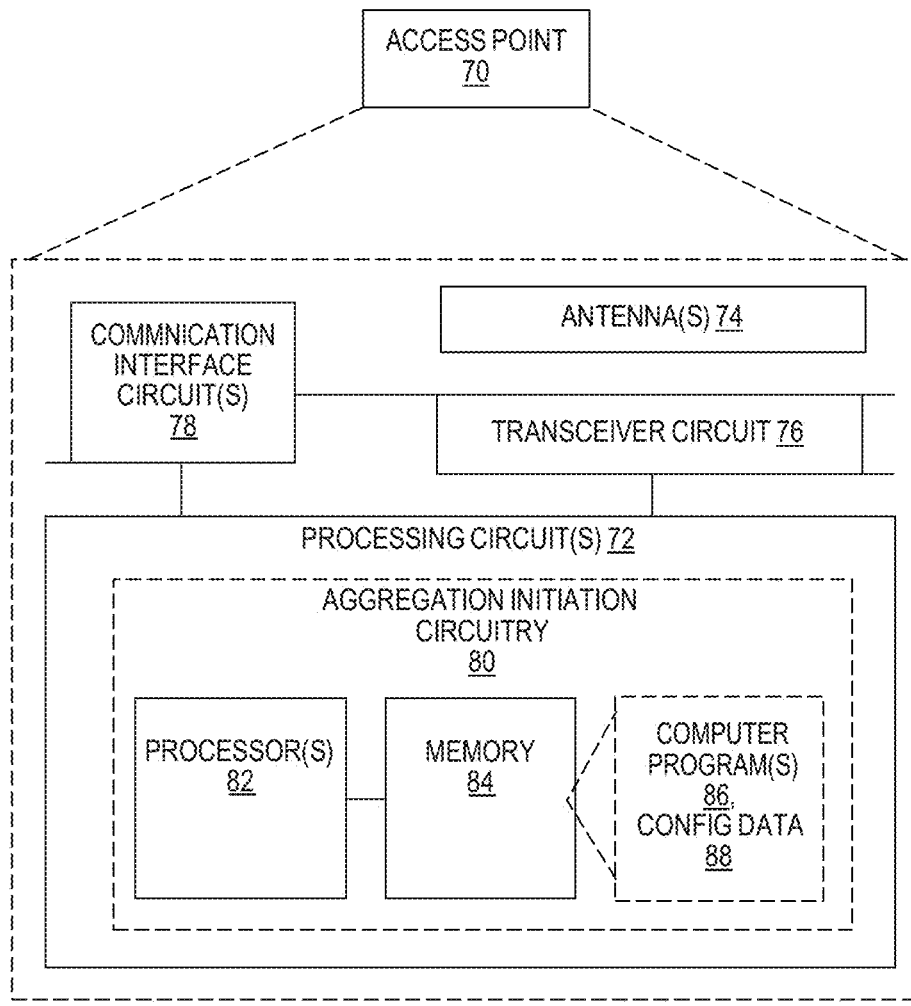
FIG. 14 illustrates a block diagram of an access point configured to initiate aggregation between a cellular network and a WLAN network, according to some embodiments.

FIG. 13 shows a 3GPP-controlled eNB 930 signaling to AP 970 to initiate aggregation. The AP 970 may be configured as shown by AP 70 in FIG. 14. FIG. 14 illustrates a diagram of an AP 70 of a WLAN network, according to some embodiments. The AP 70 provides an air interface to wireless devices, e.g., Wi-Fi or IEEE 802.11 standards, which is implemented via antennas 74 and a transceiver circuit 76. The transceiver circuit 76 may include transmitter circuits, receiver circuits, and associated control circuits that are collectively configured to transmit and receive signals according to WLAN technologies. The AP 70 may also include a communication interface circuit 78 for communicating with nodes in the core network and/or other types of nodes in the network.

The AP 70 also includes one or more processing circuits 72 that are operatively associated with the communication interface circuit 78 and transceiver circuit 76. The processing circuit 72 comprises one or more digital processors 82, e.g., one or more microprocessors, microcontrollers, DSPs, FPGAs, CPLDs, ASICs, or any mix thereof. More generally, the processing circuit 72 may comprise fixed circuitry, or programmable circuitry that is specially configured via the execution of program instructions implementing the functionality taught herein, or may comprise some mix of fixed and programmed circuitry. The processor 72 may be multi-core.

The processing circuit 72 also includes a memory 84. The memory 84, in some embodiments, stores one or more computer programs 86 and, optionally, configuration data 88. The memory 84 provides non-transitory storage for the computer program 86 and it may comprise one or more types of computer-readable media, such as disk storage, solid-state memory storage, or any mix thereof. By way of non-limiting example, the memory 84 comprises any one or more of SRAM, DRAM, EEPROM, and FLASH memory, which may be in the processing circuit 72 and/or separate from the processing circuit 72. In general, the memory 84 comprises one or more types of computer-readable storage media providing non-transitory storage of the computer program 86 and any configuration data 88 used by the AP 70.

The processor 82 may execute a computer program 86 stored in the memory 84 that configures the processor 82 to receive an indication to initiate aggregation and, in response to the indication, forward first user traffic data received from the UE 950 to a RAN node of a wide-area cellular network, such as eNB 930, and forward second user traffic data received from the eNB 930 to the UE 950. This structure and functionality may be referred to as aggregation initiation circuitry 80 in the processing circuit 72.

Figure 15:
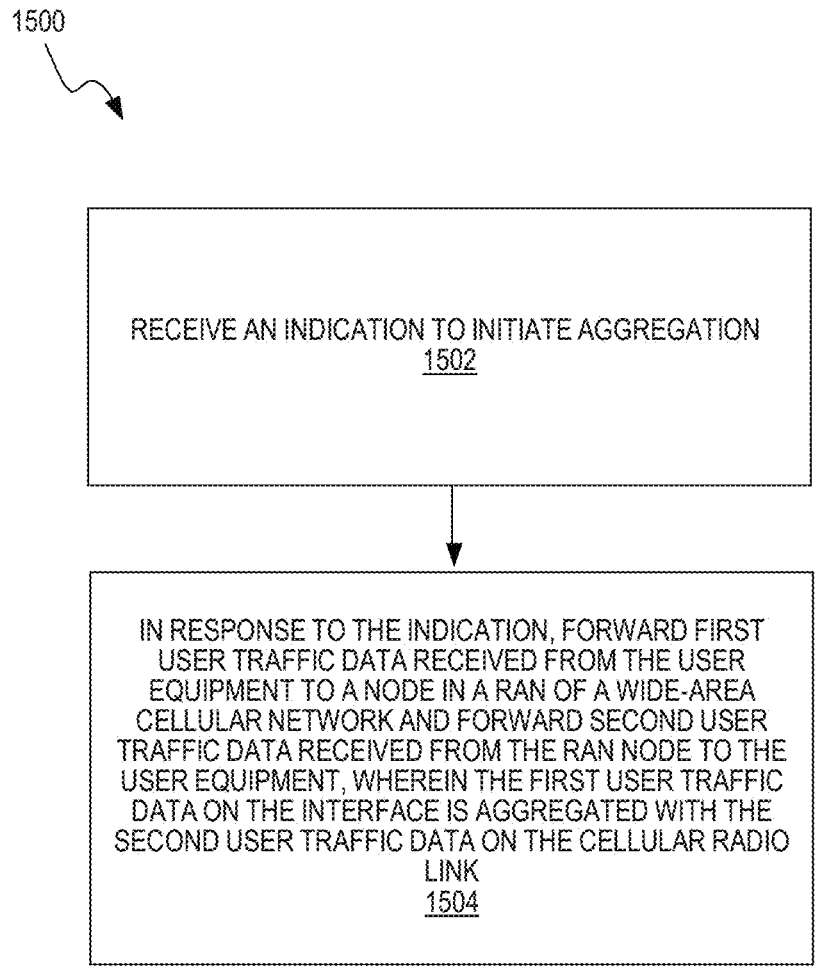
FIG. 15 illustrates a method in an access point for initiating aggregation between a cellular network and a WLAN network, according to some embodiments.
Figure 16:
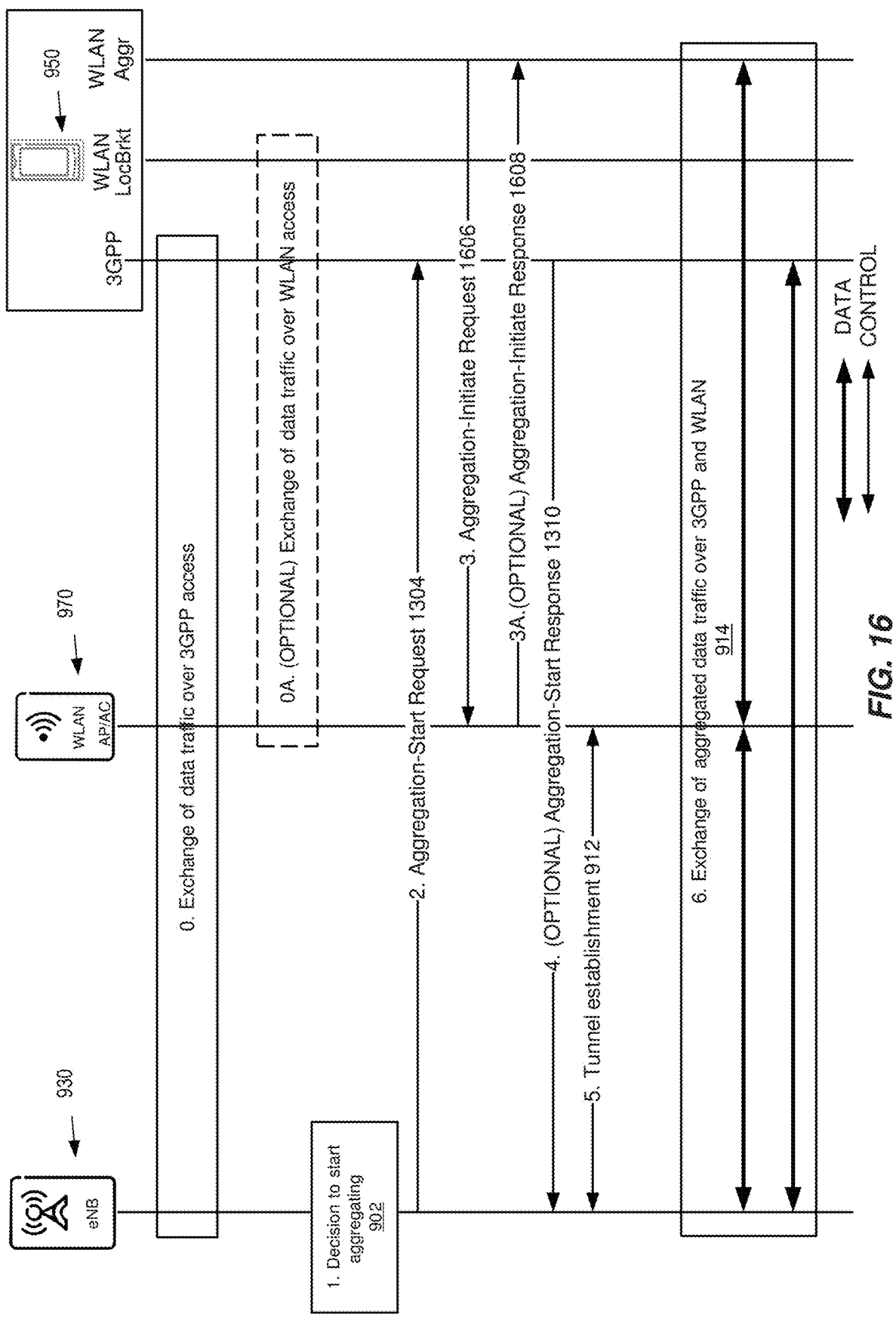
FIG. 16 illustrates a diagram for an eNodeB signaling an access point to initiate aggregation, according to some embodiments.
Figure 17:
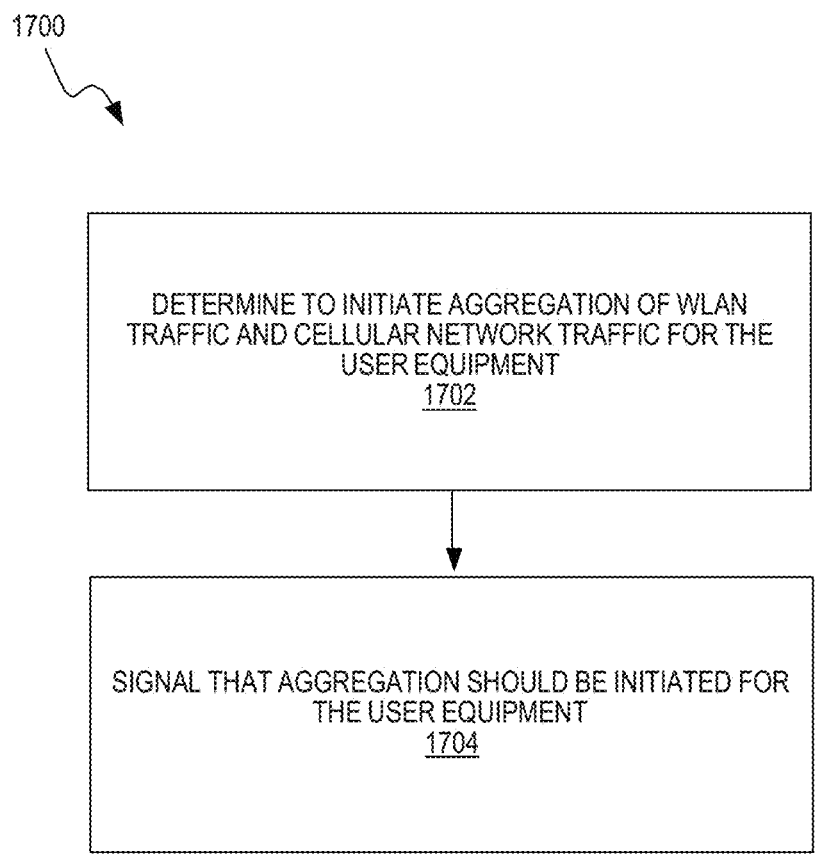
FIG. 17 illustrates a method in a network node for initiating aggregation between a cellular network and a WLAN network, according to some embodiments.

The aggregation initiation circuitry 80 is configured to perform a method, such as method 1500 of FIG. 15, according to some embodiments. The method 1500 includes receiving an indication to initiate aggregation (block 1502). The indication may be received from the UE 950. In some cases, the indication to initiate aggregation is received from the eNB 930, and the method 1500 further includes signaling to the UE 950 that aggregation should be started for the UE 950.

This indication may be request 1304 of FIG. 13. A request 1306 may be sent to the UE 950, which may incur a response 1308. A WLAN node (AP 970) may also send a response 1310 back to the eNB 930.

In response to the indication, the AP 970 forwards first user traffic data received from the UE 950 to the eNB 930 and forwards second user traffic data received from the eNB 930 to the UE 950, where the first user traffic data on the interface is aggregated with the second user traffic data on the cellular radio link (block 1504). In some embodiments, this exchange of first and second user traffic data, or aggregation of data exchanges, takes place only upon a positive response from the UE 950. For example, conditions at the UE 950 may cause the UE 950 to decline aggregation using the AP 970. Consequently, the exchange of data would not include the AP 970.

In some embodiments, the method 1500 includes determining whether to initiate aggregation and forwarding the traffic data in response to a determination to initiate aggregation. For example, admission control in the AP 970 may not allow the aggregation, and so aggregation will not be initiated. The AP 970 can also respond with an Aggregation-Initiate Response message.

In some cases, a tunnel may be established with the RAN node for exchanging the first user traffic data with the user equipment. The method 1500 may include determining traffic that is to be forwarded between the RAN node and the user equipment using a traffic flow template and an identity of the user equipment.

The UE 950 may have a plurality of physical and logical interfaces, including multiple MAC addresses. FIG. 16 shows the processes performed from different interfaces. For example, an initiation request 1606 may be sent from an aggregation WLAN interface of UE 950. The response 1608 from the AP 970 may be received at the aggregation WLAN interface. Meanwhile, other non-aggregated traffic may be exchanged by another WLAN interface, another MAC address or split MACs.

The eNB 930 determines to initiate aggregation. This determination may be a result of receiving an indication from a network node 10 to initiate aggregation. The aggregation determination circuitry 20 may be configured to perform a method 1700 for initiating aggregation of WLAN traffic and cellular network traffic for a UE 950, according to some embodiments. The method 1700 includes determining to initiate aggregation of WLAN traffic and cellular network traffic for the UE 950 (block 1702) and signaling that aggregation should be initiated for the UE 950 (block 1704).

According to some embodiments, the procedure of FIG. 9 is described as follows:

0. The UE is exchanging data traffic via the 3GPP network; control signaling is also available via the 3GPP network interfaces. 0A. (OPTIONAL) The UE is also optionally exchanging data traffic via the WLAN network. The traffic exchanged over WLAN is typically not related to tight aggregation, i.e., it is likely some Local Breakout or Non-Seamless Wi-Fi Offload traffic, or any other traffic the UE has decided to put on WLAN.

1. The 3GPP network makes a decision to start aggregation for this UE. The decision can be based on UE WLAN measurement, local load conditions in the eNB, measured throughput in LTE, traffic demand per UE and/or bearers, UE capability, UE battery level, UE positioning, the usage of a given mobile app, etc.

2. The 3GPP network communicates to the UE that aggregation should be started. The message contains information on: WLAN AP identity (e.g., Extended Service Set Identification (ESSID), Basic Service Set Identification (BSSID), Homogenous Extended Service Set Identifier (HESSID), etc.); bearers to be aggregated; type of aggregation (RLC, PDCP, core network termination, etc.); etc.

3. The UE initiates the aggregation procedure towards the indicated WLAN AP (if included in message 2). Optionally, the UE decides the WLAN AP to aggregate with, potentially trying several eligible APs and choosing the best one using criteria such as expected throughput or delay. The procedure could include some of the following steps. One step is to turn ON the WLAN radio (or creating a virtual WLAN interface to be used for the aggregation). Another step is to connect to the WLAN AP, which includes performing association and optionally authentication procedure. Another step includes initiating inter-node inter-system network interface creation/establishment (including reference points and tunnels) to be used for the aggregation control and user plane traffic. This may mainly happen in the case of non-collocated 3GPP RAN node and WLAN AP/ACH. The interface in this case can be the Xw interface, between the eNodeB and WLAN AP/AC. Another step is to use a traffic flow template (TFT) to determine the traffic that is to be routed towards the eNB. This TFT, along with the identity of the UE (e.g. UE MAC address) is then later used by the WLAN AP to decide which traffic has to be routed towards the eNodeB.

3A. The AP optionally responds with Aggregation-Initiate Response message.

4. The UE responds to the "Start Aggregation" message with confirmation or rejection. If no WLAN AP was indicated in message 2 or if the UE has chosen to aggregate with a different WLAN AP than the one indicated in message 2, the UE will include the identity of the chosen AP in this message. The UE can reject the "Start Aggregation" command either because it would not find a suitable AP (e.g., admission control in the candidate APs did not allow the aggregation) or some other UE related reason like the UE can be experiencing local interference, the WLAN radio interface could be unavailable, the battery level could be too low for the resulting power consumption, etc. In the latter case, step 4 might happen immediately after step 2. The UE includes the rejection cause in this message.

5. A tunnel to the UE is established between the eNB and the WLAN AP (unless already established) for that specific UE's aggregated traffic. The tunnel will carry aggregated user plane traffic and potentially control plane signaling. Note that the tunnel establishment could follow directly after steps 2, 2A, 3 or 3A. The tunnel establishment could be triggered either by the eNB or by the AP.

6. The aggregation is completely setup and aggregation traffic flows between the 3GPP and WLAN networks.

According to some embodiments, the procedure of FIG. 12 is described as follows. In some scenarios, the UE might have several WLAN interfaces, either physical or logical. An example of multiple physical interfaces at the UE side is the presence of more than one radio. An example of multiple logical interfaces at the UE side is the presence of several virtual interfaces, potentially each having a different MAC address.

0. The UE is exchanging data traffic via the 3GPP network; control signaling is also available via the 3GPP network interfaces. 0A. (OPTIONAL) The UE is also optionally exchanging data traffic via the WLAN network. The traffic exchanged over WLAN is typically not related to tight aggregation; it is likely some Local Breakout or Non-Seamless Wi-Fi Offload traffic, or any other traffic the UE has decided to put on WLAN.

1. The 3GPP network makes a decision to start aggregation for this UE. The decision can be based on UE WLAN measurement, local load conditions in the eNB, measured throughput in LTE, traffic demand per UE and/or bearers, UE capability, UE battery level, UE positioning, the usage of a given mobile app, etc.

2. The 3GPP network communicates to the UE that aggregation should be started. The message contains information on: WLAN AP identity; bearers to be aggregated; type of aggregation (RLC, PDCP, core network termination, etc.), etc.

3. The UE initiates the aggregation procedure towards the indicated WLAN AP (if included in message 2) using the physical or logical WLAN aggregation interface (as shown in the figure). Optionally, the UE decides the WLAN AP to aggregate with, potentially trying several eligible APs and choosing the best one using criteria such as expected throughput or delay. The procedure could include some of the following steps. One step is turning ON the WLAN radio (or creating a virtual WLAN interface to be used for the aggregation). Another step is to connect to the WLAN AP, including performing association and optionally authentication procedures. A step may be initiating inter-node inter-system network interface creation/establishment (including reference points and tunnels) to be used for the aggregation control and user plane traffic. This may mainly happen in the case of non-collocated 3GPP RAN node and WLAN AP/ACH. The interface in this case can be the Xw interface, between the eNodeB and WLAN AP/AC. Another step is using a TFT to determine the traffic that is to be routed towards the eNB. This TFT, along with the identity of the UE (e.g. UE MAC address) is then later used by the WLAN AP to decide which traffic has to be routed towards the eNodeB.

3A. The AP optionally responds with Aggregation-Initiate Response message.

4. The UE responds to the "Start Aggregation" message with confirmation or rejection. If no WLAN AP was indicated in message 2 or if the UE has chosen to aggregate with different WLAN AP than the one indicated in message 2, the UE will include the identity of the chosen AP in this message. The UE can reject the "Start Aggregation" command either because it would not find a suitable AP (e.g., admission control in the candidate APs did not allow the aggregation) or some other UE related reason like the UE can be experiencing local interference, the WLAN radio interface could be unavailable, the battery level could be too low for the resulting power consumption, etc. In the latter case, step 4 might happen immediately after step 2. The UE includes the rejection cause in this message.

5. A tunnel is established between the eNB and the WLAN AP (unless already established) for that specific UE's aggregated traffic. The tunnel will carry aggregation user plane traffic and potentially control plane signaling. Please note that the tunnel establishment could follow directly after steps 2, 2A, 3 or 3A. The tunnel establishment could be triggered either by the eNB or by the AP.

6. The aggregation is completely setup and aggregation traffic flows between the 3GPP and WLAN networks.

According to some embodiments, the procedure of FIG. 13 is described as follows.

0. The UE is exchanging data traffic with the 3GPP network; control signaling is also available via the 3GPP network interfaces. 0A. The UE is also exchanging traffic with the WLAN network. The traffic exchanged over WLAN is typically not related to tight aggregation; it is likely some Local Breakout or Non-Seamless Wi-Fi Offload traffic, or any other traffic the UE has decided to put on WLAN.

1. The 3GPP network makes a decision to start aggregation for this UE. The decision can be based on UE WLAN measurement, local load conditions in the eNB, measured throughput in LTE, traffic demand per UE and/or bearers, UE capability, UE battery level, UE positioning, the usage of a given mobile app, etc.

2. The 3GPP network communicates to the AP that aggregation should be started. The message contains information on: WLAN UE identity; bearers to be aggregated; type of aggregation (RLC, PDCP, core network termination, etc.); etc.

3. The AP sends a message to the UE, indicating that the aggregation should be initiated. At this point, the AP is transparently forwarding the aggregation-related information sent by the eNB in message 2 (e.g., bearers to be aggregated, etc.).

3A. The UE optionally responds with "Aggregation-Initiate Response" message. If the UE rejects the "Start Aggregation" command, it provides the reason (e.g., the battery level could be too low for the resulting power consumption, etc.). The procedure could include some of the following steps. One step is initiating inter-node inter-system network interface creation/establishment (including reference points and tunnels) to be used for the aggregation control and user plane traffic. This may mainly happen in the case of non-collocated 3GPP RAN node and WLAN AP/ACH. The interface in this case can be the Xw interface, between the eNodeB and WLAN AP/AC. Another step includes installing an uplink traffic flow template that will be used to determine the traffic that is to be routed towards the WLAN AP and which towards the eNB.

4. The AP optionally responds with Aggregation-Initiate Response message.

5. A tunnel is established between the eNB and the WLAN AP (unless already established) for that specific UE's aggregated traffic. The tunnel will carry aggregation use plane traffic and potentially control plane signaling. Note that the tunnel establishment could follow directly after steps 2, 3, 3A. The tunnel establishment could be triggered either by the eNB or by the AP.

6. The aggregation is completely setup and aggregation traffic flows between the 3GPP and WLAN networks.

According to some embodiments, the procedure shown in FIG. 16 is described as follows.

0. The UE is exchanging data traffic with the 3GPP network; control signaling is also available via the 3GPP network interfaces. 0A. The UE is also exchanging traffic with the WLAN network. The traffic exchanged over WLAN is typically not related to tight aggregation; it is likely some Local Breakout or Non-Seamless Wi-Fi Offload traffic, or any other traffic the UE has decided to put on WLAN.

1. The 3GPP network makes a decision to start aggregation for this UE. The decision can be based on UE WLAN measurement, local load conditions in the eNB, measured throughput in LTE, traffic demand per UE and/or bearers, UE capability, UE battery level, UE positioning, the usage of a given mobile app, etc.

2. The 3GPP network communicates to the AP that aggregation should be started. The message contains information on: WLAN UE identity; bearers to be aggregated; type of aggregation (RLC, PDCP, core network termination, etc.); etc.

3. The AP sends a message to the UE, indicating that the aggregation should be initiated. At this point, the AP is transparently forwarding the aggregation-related information sent by the eNB in message 2 (e.g., bearers to be aggregated, etc.). The AP uses the currently existing WLAN signaling (i.e., the local breakout signaling).

3A. The UE optionally responds with "Aggregation-Initiate Response" message, using its physical or logical WLAN aggregation interface. If the UE rejects the "Start Aggregation" command, it provides the reason (e.g., the battery level could be too low for the resulting power consumption, etc.). The procedure could include some of the following steps. One step is turning ON the WLAN radio (or creating a virtual WLAN interface to be used for the aggregation). Another step is connecting to the WLAN AP, including performing association and optionally authentication procedures. A step may be initiating inter-node inter-system network interface creation/establishment (including reference points and tunnels) to be used for the aggregation control and user plane traffic. This may mainly happen in the case of non-collocated 3GPP RAN node and WLAN AP/ACH. The interface in this case can be the Xw interface, between the eNodeB and WLAN AP/AC. One step includes installing an uplink traffic flow template that will be used to determine the traffic that is to be routed towards the WLAN AP and which towards the eNB.

4. The AP optionally responds with Aggregation-Initiate Response message.

5. A tunnel is established between the eNB and the WLAN AP (unless already established) for that specific UE's aggregated traffic. The tunnel will carry aggregation use plane traffic and potentially control plane signaling. Please note that the tunnel establishment could follow directly after steps 2, 3, 3A. The tunnel establishment could be triggered either by the eNB or by the AP.

6. The aggregation is completely setup and aggregation traffic flows between the 3GPP and WLAN networks.

Figure 18:
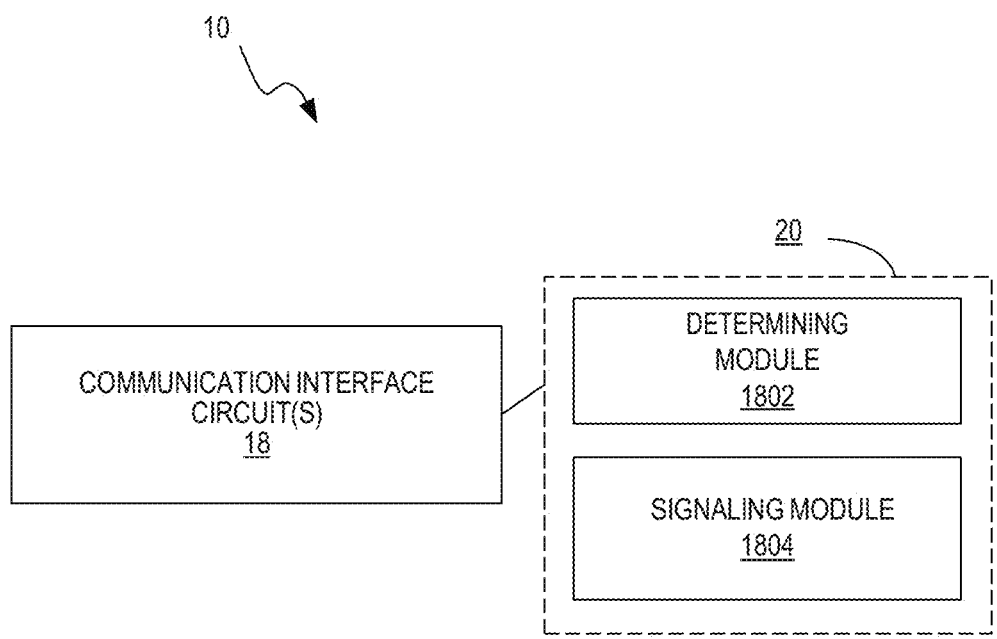
FIG. 18 illustrates an example functional implementation of a network node configured to initiate aggregation between a cellular network and a WLAN network, according to some embodiments.

FIG. 18 illustrates an example functional module or circuit architecture as may be implemented in the network node 10, e.g., based on the processing circuitry 20. The illustrated embodiment at least functionally includes a determining module 1802 for determining to initiate aggregation of WLAN traffic and cellular network traffic for the user equipment. The implementation also includes a signaling module 1804 for signaling that aggregation should be initiated for the user equipment.

Figure 19:
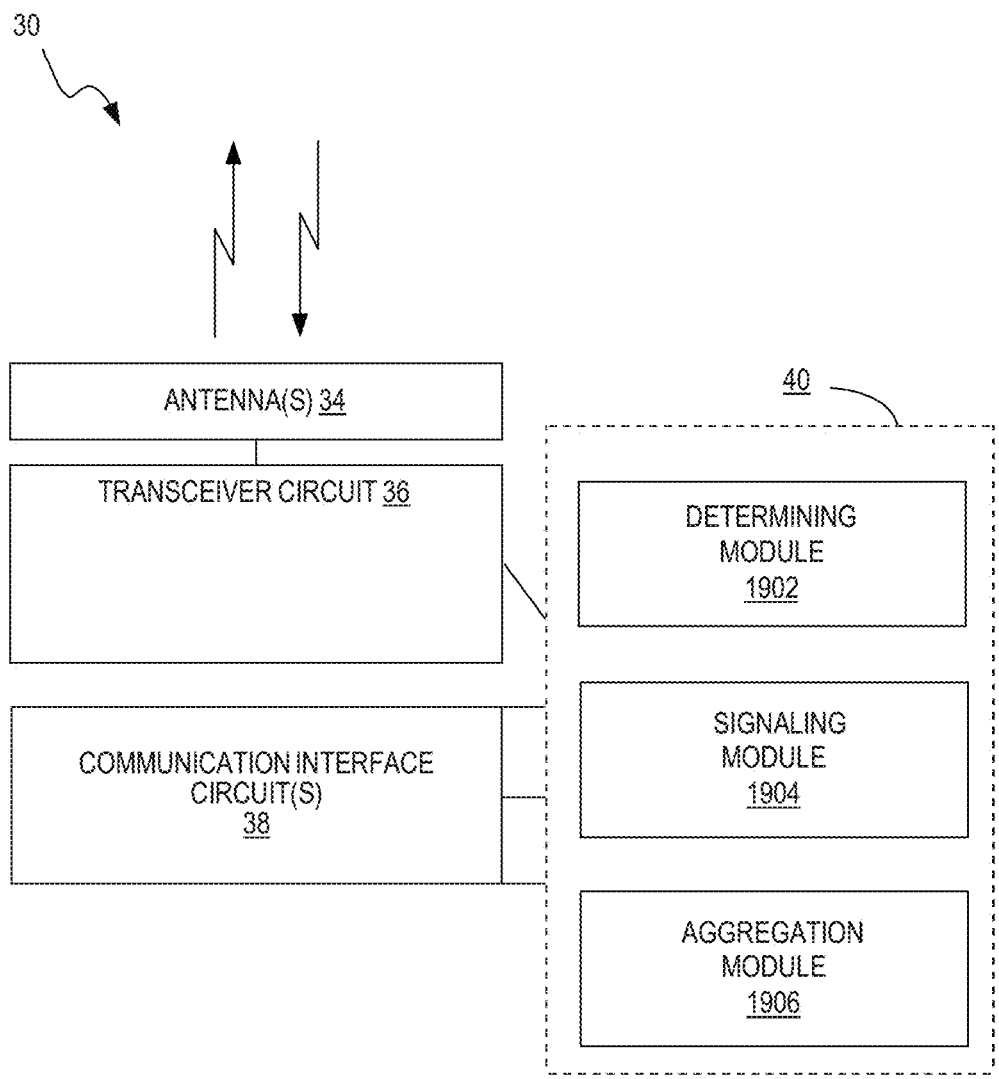
FIG. 19 illustrates an example functional implementation of a network access node configured to initiate aggregation between a cellular network and a WLAN network, according to some embodiments.

FIG. 19 illustrates an example functional module or circuit architecture as may be implemented in the access network node 30, e.g., based on the processing circuitry 40. The illustrated embodiment at least functionally includes a determining module 1902 for determining to initiate aggregation of WLAN traffic and cellular network traffic for the user equipment and a signaling module 1904 for signaling, to the user equipment or to a node of a WLAN, that aggregation should be initiated for the user equipment. The implementation also includes an aggregation module 1906 for exchanging first user traffic data with the user equipment using an interface between the RAN node and the WLAN node and contemporaneously exchanging second user traffic data with the user equipment via a cellular radio link, where the first user traffic data on the interface is aggregated with the second user traffic data on the cellular radio link.

Figure 20:
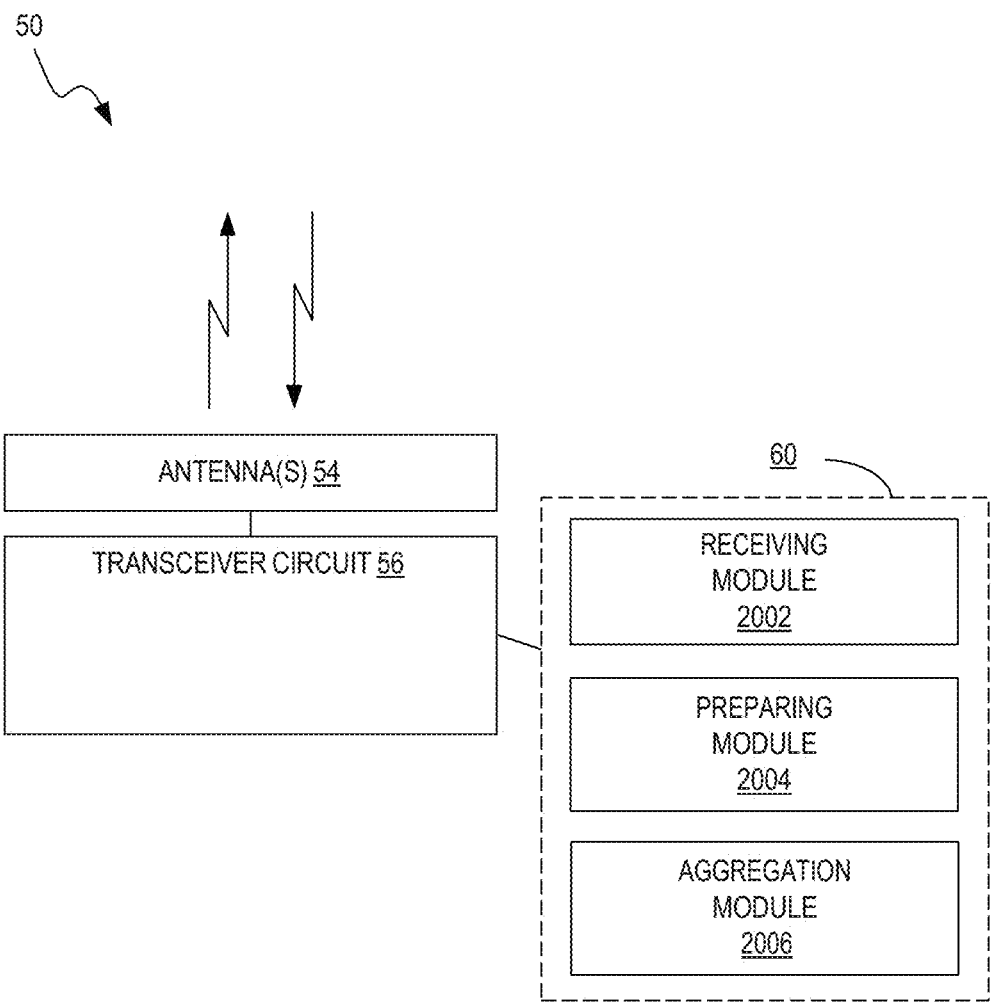
FIG. 20 illustrates an example functional implementation of a user equipment configured to initiate aggregation between a cellular network and a WLAN network, according to some embodiments.

FIG. 20 illustrates an example functional module or circuit architecture as may be implemented in the user equipment 50, e.g., based on the processing circuitry 60. The illustrated embodiment at least functionally includes a receiving module 2002 for either from a RAN node of the wide area cellular network or from a WLAN node an indication to initiate aggregation of WLAN traffic and cellular network traffic. The implementation includes a preparing module 2004 for preparing to initiate aggregation responsive to the indication. The implementation also includes an aggregation module 2006 for exchanging first user traffic data with the RAN node of the wide area cellular network and contemporaneously exchanging second user traffic data with the WLAN node, where the first user traffic data on the interface is aggregated with the second user traffic data on the cellular radio link.

Figure 21:
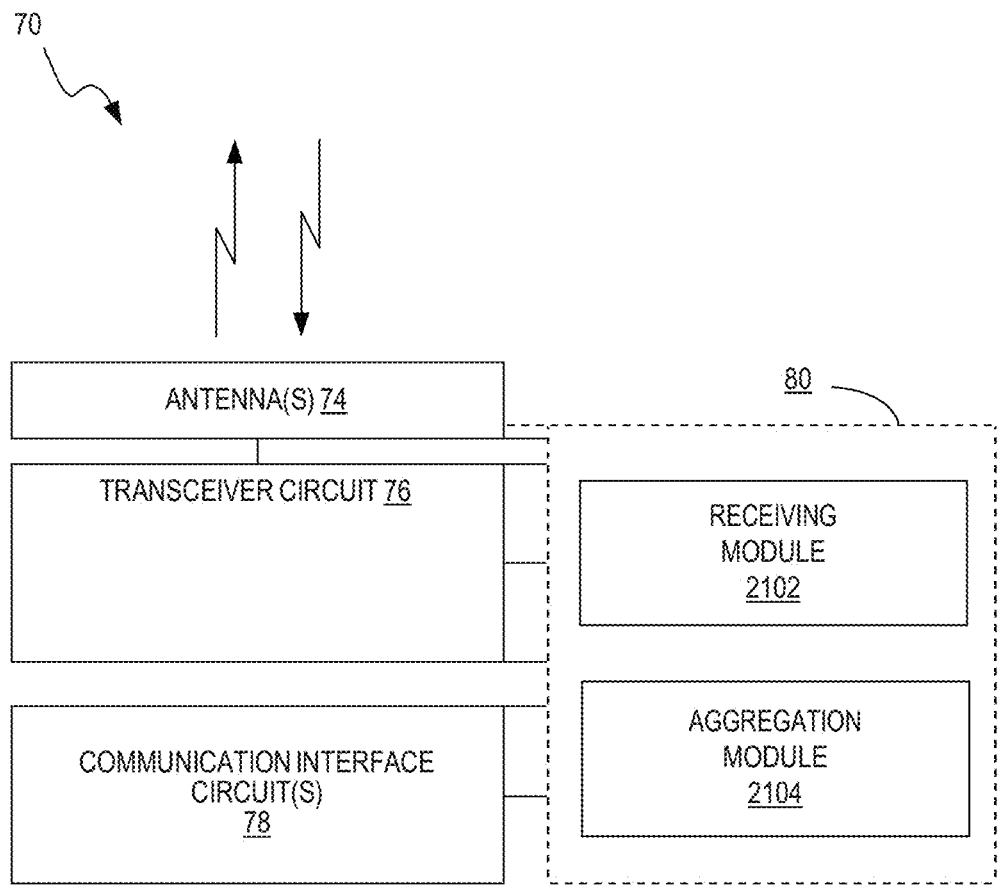
FIG. 21 illustrates an example functional implementation of an access point configured to initiate aggregation between a cellular network and a WLAN network, according to some embodiments.

FIG. 21 illustrates an example functional module or circuit architecture as may be implemented in the access point 70, e.g., based on the processing circuitry 80. The illustrated embodiment at least functionally includes a receiving module 2102 for receiving an indication to initiate aggregation and an aggregation module 2104 for, in response to the indication, forwarding first user traffic data received from the user equipment to a node in a RAN of a wide-area cellular network and forwarding second user traffic data received from the RAN node to the user equipment.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a node of a radio access network (RAN) of a wide area cellular network, for initiating aggregation of wireless local area network (WLAN) traffic and cellular network traffic for a user equipment, the method comprising:
determining to initiate aggregation of WLAN traffic and cellular network traffic for the user equipment;
signaling to the user equipment that aggregation of WLAN traffic and cellular network traffic should be initiated for the user equipment, wherein the signaling comprises transmitting, to the user equipment, a message comprising an indication of which bearers are to be aggregated and/or an indication of a type of aggregation; and,
responsive to receiving a confirmation message from the user equipment, exchanging first user traffic data with the user equipment using an interface between the RAN node and the WLAN node, and contemporaneously exchanging second user traffic data with the user equipment via a cellular radio link, wherein the first user traffic data on the interface is aggregated with the second user traffic data on the cellular radio link.

2. The method of claim 1, wherein the method further comprises establishing a tunnel between the RAN node and the WLAN node, and wherein exchanging the first user traffic data with the user equipment is performed via the tunnel.

3. The method of claim 1, wherein the determining to initiate aggregation is based on at least one of: a user equipment WLAN measurement; local load conditions in the RAN node; measured throughput in the RAN; traffic demand per user equipment and/or bearers; a user equipment capability; a user equipment battery level; a user equipment position; and a usage of a given mobile application.

4. The method of claim 1, wherein the determining to initiate aggregation comprises receiving an instruction to initiate aggregation from another node.

5. A method, in a node of a wireless local area network (WLAN) for initiating aggregation of WLAN traffic and cellular network traffic for a user equipment, the method comprising:

receiving an indication to initiate aggregation for the user equipment; and in response to the indication, forwarding first user traffic data received from the user equipment to a node in a radio access network (RAN) of a wide-area cellular network and forwarding second user traffic data received from the RAN node to the user equipment, wherein the first user traffic data on the interface is aggregated with the second user traffic data on the cellular radio link.

6. The method of claim 5, further comprising determining whether to initiate aggregation, and wherein the forwarding is responsive to a determination to initiate aggregation.

7. The method of claim 5, further comprising establishing a tunnel with the RAN node for exchanging the first user traffic data with the user equipment.

8. The method of claim 5, further comprising determining traffic that is to be forwarded between the RAN node and the user equipment using a traffic flow template and an identity of the user equipment.

9. The method of claim 5, wherein the indication to initiate aggregation is received from the RAN node, and wherein the method further comprises signaling to the user equipment that aggregation should be started for the user equipment.

10. The method of claim 5, wherein the receiving the indication comprises receiving the indication from the user equipment.

11. A node of a radio access network (RAN) of a wide area cellular network, the RAN node being configured to initiate aggregation of wireless local area network (WLAN) traffic and cellular network traffic for a user equipment, wherein the RAN node comprises:

a transceiver circuit configured to communicate with the user equipment;
a communication interface circuit configured to communicate with at least one node of a WLAN; and
a processing circuit configured to:
determine to initiate aggregation of WLAN traffic and cellular network traffic for the user equipment;
signal to the user equipment via the transceiver circuit that aggregation should be initiated for the user equipment, wherein the signaling comprises transmitting, to the user equipment, a message comprising an indication of which bearers are to be aggregated and/or an indication of a type of aggregation; and,
responsive to receipt of a confirmation message from the user equipment, exchange first user traffic data with the user equipment using an interface between the RAN node and the WLAN node and contemporaneously exchange second user traffic data with the user equipment via a cellular radio link, wherein the first user traffic data on the interface is aggregated with the second user traffic data on the cellular radio link.

12. The RAN node of claim 11, wherein the processing circuit is configured to establish a tunnel between the RAN node and the WLAN node.

13. The RAN node of claim 11, wherein the processing circuit is configured to determine to initiate aggregation based on at least one of: a user equipment WLAN measurement; local load conditions in the RAN node; a measured throughput in the RAN; a traffic demand per user equipment and/or bearers; a user equipment capability; a user equipment battery level; a user equipment location; and a usage of a given mobile application.

14. A node of a wireless local area network (WLAN) configured to initiate aggregation of WLAN traffic and cellular network traffic for a user equipment, wherein the WLAN node comprises:

a transceiver circuit configured to communicate with the user equipment;
a communication interface circuit configured to communicate with a node in a radio access network (RAN) of a wide-area cellular network; and
a processing circuit configured to:
receive an indication to initiate aggregation for the user equipment via the transceiver circuit or via the communication interface circuit; and
in response to the indication, forward first user traffic data received from the user equipment to the RAN node and forward second user traffic data received from the RAN node to the user equipment, wherein the first user traffic data on the interface is aggregated with the second user traffic data on the cellular radio link.

15. The WLAN node of claim 14, wherein the processing circuit is configured to determine whether to initiate aggregation, and wherein the forwarding is responsive to a determination to initiate aggregation.

16. The WLAN node of claim 14, wherein the processing circuit is configured to establish a tunnel with the RAN node for exchanging the first user traffic data with the user equipment.

17. The WLAN node of claim 14, wherein the processing circuit is configured to determine traffic that is to be forwarded between the RAN node and the user equipment using a traffic flow template and an identity of the user equipment.

18. A method, in a node of a radio access network (RAN) of a wide area cellular network, for initiating aggregation of wireless local area network (WLAN) traffic and cellular network traffic for a user equipment, the method comprising:

determining to initiate aggregation of WLAN traffic and cellular network traffic for the user equipment;
signaling to a node of a WLAN that aggregation of WLAN traffic and cellular network traffic should be initiated for the user equipment, wherein the signaling comprises transmitting, to the WLAN node, a message comprising an indication of which bearers are to be aggregated and/or an indication of a type of aggregation; and,
responsive to receiving a confirmation message from the WLAN node, exchanging first user traffic data with the user equipment using an interface between the RAN node and the WLAN node, and contemporaneously exchanging second user traffic data with the user equipment via a cellular radio link, wherein the first user traffic data on the interface is aggregated with the second user traffic data on the cellular radio link.

19. A node of a radio access network (RAN) of a wide area cellular network, the RAN node being configured to initiate aggregation of wireless local area network (WLAN) traffic and cellular network traffic for a user equipment, wherein the RAN node comprises:

a transceiver circuit configured to communicate with the user equipment;
a communication interface circuit configured to communicate with at least one node of a WLAN; and
a processing circuit configured to:
determine to initiate aggregation of WLAN traffic and cellular network traffic for the user equipment;
signal to the WLAN node via the communication interface circuit that aggregation should be initiated for the user equipment, wherein the signaling comprises transmitting, to the WLAN node, a message comprising an indication of which bearers are to be aggregated and/or an indication of a type of aggregation; and,
responsive to receipt of a confirmation message from the WLAN node, exchange first user traffic data with the user equipment using an interface between the RAN node and the WLAN node and contemporaneously exchange second user traffic data with the user equipment via a cellular radio link, wherein the first user traffic data on the interface is aggregated with the second user traffic data on the cellular radio link.

\* \* \* \* \*